(12) United States Patent
Grant et al.

(10) Patent No.: US 12,526,830 B2
(45) Date of Patent: Jan. 13, 2026

(54) SYSTEM AND METHOD FOR ADAPTIVE COMMUNICATIONS

(71) Applicant: MYRIOTA PTY LTD, Adelaide (AU)

(72) Inventors: Alexander James Grant, Adelaide (AU); David Victor Lawrie Haley, Adelaide (AU); Kelvin Jon Layton, Adelaide (AU); Robert George Mckilliam, Adelaide (AU)

(73) Assignee: MYRIOTA PTY LTD, Adelaide (AU)

( * ) Notice: Subject to any disclaimer, the term of this patent is extended or adjusted under 35 U.S.C. 154(b) by 637 days.

(21) Appl. No.: 17/916,296

(22) PCT Filed: Mar. 29, 2021

(86) PCT No.: PCT/AU2021/000027
§ 371 (c)(1),
(2) Date: Sep. 30, 2022

(87) PCT Pub. No.: WO2021/195687
PCT Pub. Date: Oct. 7, 2021

(65) Prior Publication Data
US 2023/0138213 A1    May 4, 2023

(30) Foreign Application Priority Data
Apr. 3, 2020 (AU) ................ 2020901049

(51) Int. Cl.
*H04W 72/541* (2023.01)
*H04B 7/185* (2006.01)

(52) U.S. Cl.
CPC ...... *H04W 72/541* (2023.01); *H04B 7/18513* (2013.01)

(58) Field of Classification Search
CPC ............ H04W 72/541; H04W 72/542; H04W 72/23; H04W 24/10; H04W 72/0446;
(Continued)

(56) References Cited

U.S. PATENT DOCUMENTS 5,669,062 A    9/1997    Olds et al.
9,014,620 B2    4/2015    Dankberg
(Continued)

FOREIGN PATENT DOCUMENTS

CN    108882245 A    11/2018
JP    2018515962 A    6/2018

*Primary Examiner* — Ricky Q Ngo
*Assistant Examiner* — Kabir U Jahangir
(74) *Attorney, Agent, or Firm* — Seed Intellectual Property Law Group LLP

(57) ABSTRACT

An adaptive satellite communication system uses an interference aware scheduler to select slot transmission parameters for transmitting a message. When scheduling transmission of a message by a particular terminal the scheduler determines interference parameters of any external communication systems for the transmitter location and intended transmission time period. The scheduler then uses this to estimate if a particular combination of slot transmission parameters are likely to cause interference and can then adjust the slot transmission parameters to reduce potential interference. The scheduler may use an optimisation method which is configured to select slots based subject to constraints related to latency, probability of transmission failure/success and interference.

41 Claims, 6 Drawing Sheets

(58) Field of Classification Search
CPC ........... H04W 72/1263; H04B 7/18513; H04B 7/18543; H04B 7/18532; H04B 7/1853; H04B 7/18563; H04B 7/204; H04B 7/212
See application file for complete search history.

(56) References Cited

U.S. PATENT DOCUMENTS

| | | |
|---|---|---|
| 11,146,328 B2 | 10/2021 | Determan et al. |
| 2007/0274249 A1 | 11/2007 | Hulbert et al. |
| 2009/0252099 A1* | 10/2009 | Black ................. H04W 72/542 370/329 |
| 2014/0295752 A1* | 10/2014 | Dankberg .......... H04B 7/18513 455/12.1 |
| 2015/0195674 A1* | 7/2015 | Opshaug ................ G01S 5/02 455/456.6 |
| 2017/0288769 A1 | 10/2017 | Miller et al. |
| 2017/0324463 A1 | 11/2017 | Jalali |
| 2020/0029265 A1 | 1/2020 | Choquette |

\* cited by examiner

Figure 1A *(Prior Art)*

SYSTEM AND METHOD FOR ADAPTIVE COMMUNICATIONS

PRIORITY DOCUMENTS

The present application claims priority from Australian Provisional Patent Application No. 2020901049 titled "SYSTEM AND METHOD FOR ADAPTIVE COMMUNICATIONS" and filed on 3 Apr. 2020, the content of which is hereby incorporated by reference in its entirety.

INCORPORATION BY REFERENCE

The following patent applications are referred to in the present application:

PCT/AU2013/000895 titled CHANNEL ALLOCATION IN A COMMUNICATION SYSTEM and filed on 14 Aug. 2013 claiming priority from Australian Provisional Patent Application No. 2012903489 filed on 14 Aug. 2012;

PCT/AU2013/001078 titled COMMUNICATION SYSTEM AND METHOD and filed on 20 Sep. 2013 claiming priority from Australian Provisional Patent Application No. 2012904130 filed on 21 Sep. 2012;

PCT/AU2013/001079 titled MULTI-ACCESS COMMUNICATION SYSTEM and filed on 20 Sep. 2013 claiming priority from Australian Provisional Patent Application No. 2012904145 filed on 21 Sep. 2012;

PCT/AU2014/000826 titled A MULTIUSER COMMUNICATIONS SYSTEM and filed on 21 Aug. 2014 claiming priority from Australian Provisional Patent Application No. 2013903163 filed on 21 Aug. 2013;

PCT/AU2015/000743 titled MULTICARRIER COMMUNICATIONS SYSTEM and filed on Sep. 12, 2015 claiming priority from Australian Provisional Patent Application No. 2014904976 filed on Sep. 12, 2014;

PCT/AU2017/000058 titled TERMINAL SCHEDULING METHOD IN SATELLITE COMMUNICATION SYSTEM and filed on 24 Feb. 2017 claiming priority from Australian Provisional Patent Application No. 2016900685 filed on 25 Feb. 2016;

PCT/AU2017/000108 titled POSITION ESTIMATION IN A LOW EARTH ORBIT SATELLITE COMMUNICATIONS SYSTEM and filed on 16 May 2017 claiming priority from Australian Provisional Patent Application No. 2016901913 filed on 20 May 2016;

PCT/AU2017/000286 titled SYSTEM AND METHOD FOR GENERATING EXTENDED SATELLITE EPHEMERIS DATA and filed on 21 Dec. 2017 claiming priority from Australian Provisional Patent Application No. 2016905314 filed on 22 Dec. 2016; and PCT/AU2018/000151 titled SYSTEM AND METHOD FOR PREDICTION OF COMMUNICATIONS LINK QUALITY and filed on 28 Aug. 2018 claiming priority from Australian Provisional Patent Application No. 2017903470 filed on 28 Aug. 2017.

The content of each of these applications is hereby incorporated by reference in their entirety.

TECHNICAL FIELD

The present disclosure relates to wireless communication systems. In a particular form the present disclosure relates to reducing interference between multiple wireless communication systems using a shared physical communications medium.

BACKGROUND

Multiple communication systems 10 that operate using a shared physical communications medium (channel) 13 have the potential to interfere with one another and degrade system performance. System operators may coordinate their use of the medium at a high level such as reserving segments of radio frequency spectrum on a permanent basis. However this leads to inefficient utilization, especially when use of the medium is intermittent or temporal. For example, in a low Earth orbit (LEO) satellite system 1, communication between a satellite access node 10 and a terminal 20 will only occur when the terminal is within the field of view 12 of the satellite 10 as it passes overhead.

FIG. 1A shows a schematic diagram of two satellite communications systems, A and B, with non-overlapping fields of view 12 according to an embodiment. In this embodiment the terminals 20 are distributed on Earth (e.g., on land, water, or airborne) and the access nodes 10 are LEO satellites. Terminals 20 in group A (labelled TA.n) communicate with Satellite 20 labelled SA.1 from system A. Terminals 24 in group B (labelled TB.n) communicate with Satellite 20 labelled SB.1 from system B. Systems A and B may be independently operated by different service providers using different communications protocols. We therefore say that system B is external to system A and vice-versa. They may use a common communications medium (channel) 13 with overlapping slots. In this case only one satellite 20 is shown for each communication system 1, but typically each system comprises a plurality of access nodes 20 including satellites distributed around the earth, and may also include high altitude platforms and terrestrial access nodes. Gateway terminals and ground stations are omitted for clarity, and in each system only one satellite 20 is shown.

Communication between terminals 20 and satellite 10 has uplink 16 and downlink 18 components as shown in FIG. 1A. We will define the uplink as carrying transmissions from a terminal to the satellite, and the downlink as carrying transmissions from the satellite to the terminal. Signals from system A (transmissions from terminals or satellites) are considered interference into system B and vice versa. As shown in FIG. 1A the respective satellite fields of view 12 do not overlap, and the systems can operate concurrently without causing interference to each other.

FIG. 1B shows a schematic diagram of two satellite communications systems 10 with overlapping 30 fields of view 12 according to an embodiment. In this case terminal TA.1 is in the field of view of both satellites SA.1 and SA.2. If systems A and B use slots that (partially) overlap then the receiver at SB.1 may be the victim of interference 32 caused by transmissions from TA.1, and the receiver at TA.1 may be the victim to interference 32 caused by transmissions from SB.1.

One high level approach to coordinating these two satellite systems is to permanently allocate radio spectrum to each satellite system. However in many cases, particularly for LEO satellite systems, this is extremely wasteful as satellites in an allocated system are only transiently over a fixed point on the Earth's surface, and do not provide continuous 24/7 coverage. Further, different countries may operate different spectrum allocation/licensing procedures, and thus permanent allocation (or licensing) may not be available in all countries that terminals are located within (i.e., that satellite's service). Additionally permanent allocation can lead to equity issues as further satellite systems are launched.

There is thus a need for a method for communication systems to adapt their operation to efficiently utilize a shared communications medium, or at least provide a useful alternative to existing methods.

SUMMARY

According to a first aspect, there is provided a method for scheduling transmissions in a wireless communication system comprising one or more access nodes, and a plurality of terminals, wherein the one or more access nodes comprises at least one access node with a moving field of view relative to the plurality of terminals, the method comprising:

receiving one or more messages for transmission;

determining one or more interference parameters of one or more external communication systems for a transmission location and during a transmission time period;

scheduling transmission of the one or more messages in one or more slots in a plurality of slots by selecting one or more slot transmission parameters for transmitting the one or more messages during the transmission time period and determining, using the one or more interference parameters, the likelihood that the selected one or more slot transmission parameters are likely to cause interference to the one or more external communication systems, and if interference is determined to be likely, then adjusting one or more of the slot transmission parameters to determine if the change will result in an acceptable reduction of the interference.

In one form, determining the one or more interference parameters comprises storing a slot reservation map that stores one or more reserved slots for the one or more external communication systems, and determining, using the one or more interference parameters, the likelihood that the selected one or more slot transmission parameters are likely to cause interference comprises looking up any reserved slots associated with any of the detected or estimated one or more external communication systems and preventing selection of the reserved slots.

In one form, determining the one or more interference parameters comprises storing a slot reservation map that stores one or more reserved slots for the one or more external communication systems and one or more of the one or more reserved slots are reserved on a per-satellite level, and determining using the one or more interference parameters, the likelihood that the selected one or more slot transmission parameters are likely to cause interference comprises detecting or estimating if a satellite associated with a reserved slot is detected or estimated to be present during the transmission time period and preventing selection of the reserved slot of the satellite is detected or estimated to be present.

In one form, determining the one or more interference parameters comprises storing a slot reservation map that stores one or more reserved slots for the one or more external communication systems and one or more of the one or more reserved slots are reserved on a per-geographic region, and determining using the one or more interference parameters, the likelihood that the selected one or more slot transmission parameters are likely to cause interference comprises estimating the location of the transmitter during the transmission period and determining if the transmitter is located within a geographic region associated with one or more reserved slots and preventing allocation of the respective reserved one or more slots.

In one form, determining one or more interference parameters comprises determining an elevation threshold of one or more receivers in the one or more external communication systems and determining using the one or more interference parameters, the likelihood that the selected one or more slot transmission parameters are likely to cause interference comprises estimating an elevation angle of a receiver in one or more external communication systems during the transmission time period and determining if the elevation angle exceeds the elevation threshold for the receiver.

In one form, determining one or more interference parameters of one or more external communication systems comprises detecting a beacon signal from a transmitter in the one or more external communication systems and determining one or more beacon signal characteristics wherein the one or more beacon signal characteristics are used to determine if interference is likely.

In one form, determining one or more interference parameters of one or more external communication systems comprises receiving one or more transmissions from a transmitter in the one or more external communication systems on a medium coordination channel which provides information to assist in sharing the medium comprises one or more of an elevation angle, a signal to noise ratio, an interference level, a power level, a link quality estimate, a channel state estimate, or a tolerable interference level. In a further form, the information is used to update the slot reservation map.

In one form, determining one or more interference parameters of one or more external communication systems for a transmission location during the transmission time period comprises:

obtaining ephemeris data on one or more satellite receivers in the one or more external communication systems; and obtaining an estimate of the position of the transmitter during the transmission time period, wherein determining, using the one or more interference parameters, the likelihood that the selected one or more slot transmission parameters are likely to cause interference uses the terminal position, ephemeris data and transmission time period to estimate the likelihood of interference with the one or more receivers in the one or more external communication systems.

In one form, determining, using the one or more interference parameters, the likelihood that the selected one or more slot transmission parameters are likely to cause interference comprises estimating a time varying estimate of inference over the transmission time period and selecting one or more slot transmission parameters and adjusting one or more of the slot transmission parameters is performed by using an optimization method to determine the one or more slot transmission parameters that minimize or constrain the total interference.

In a further form, determining, using the one or more interference parameters, the likelihood that the selected one or more slot transmission parameters are likely to cause interference further comprises estimating a probability of error that a transmission is not received at a target receiver and a latency and the optimization method determines the one or more slot transmission parameters by minimizing one of the time varying estimate of inference over the transmission time period, the probability of error that a transmission is not received at a target receiver and the latency subject to one or more constraints on the time varying estimate of inference over the transmission time period, the probability of error that a transmission is not received at a target receiver and the latency, and the optimization is performed jointly over all slot transmission parameters.

In a further form, the optimization is performed subject to a throughput constraint. In a further form, the throughput constraint comprises restricting transmission times during the transmission time period to a discrete grid of width W.

In one form, the latency is an overall expected latency. In one form, the latency constraint is based on a percentile probability.

In one form, determining, using the one or more interference parameters, the likelihood that the selected one or more slot transmission parameters are likely to cause interference further comprises estimating a probability of error that a transmission is not received at a target receiver and a latency and the optimization method uses a greedy scheduling algorithm that selects a transmission time sequentially such that transmissions are scheduled at times that decreases the latency and probability of error whilst minimally increasing the interference.

In a further form, the greedy scheduling algorithm minimizes a mean latency and a total external interference.

In one form, the one or more slot parameters comprises any transmission degree of freedom.

In one form, the transmission degree of freedom comprises one or more of time, frequency, antenna polarization, spreading sequence, transmit power, or spatial division.

In one form, the method further comprises obtaining an estimate of the position of the transmitter during the transmission time period, and determining, using the one or more interference parameters, the likelihood that the selected one or more slot transmission parameters are likely to cause interference uses the estimate of the position of the transmitter to determine if transmission in a slot is likely to cause interference.

In one form, the method is performed in a terminal apparatus. In one form, the method is performed in a satellite access node. In one form, the communication system further comprises one or more gateways and the method is performed in at least one gateway.

In one form, at least one of the access nodes is a satellite access node or high altitude platform.

According to a second aspect, there is provided a terminal apparatus comprising an uplink baseband transmitter and an RF front end, and a scheduler configured to perform the method of the first aspect.

According to a third aspect, there is provided an access node apparatus comprising a downlink baseband transmitter and an RF front end, and a scheduler configured to perform the method of the first aspect.

According to a fourth aspect, there is provided a gateway apparatus comprising an uplink baseband transmitter and an RF front end, and a scheduler configured to perform the method of the first aspect.

According to a fifth aspect, there is provided a communication system comprising one or more terminal apparatus, one or more satellite access nodes, and a core network component comprising one or more gateways, wherein the system is configured to perform the method of the first aspect, wherein implementation is distributed across the system.

BRIEF DESCRIPTION OF DRAWINGS

Embodiments of the present disclosure will be discussed with reference to the accompanying drawings wherein:

FIG. 1A shows a schematic diagram of two satellite communications systems with non-overlapping fields of view according to an embodiment;

In the following description, like reference characters designate like or corresponding parts throughout the figures.

DETAILED DESCRIPTION

Figure 2A:
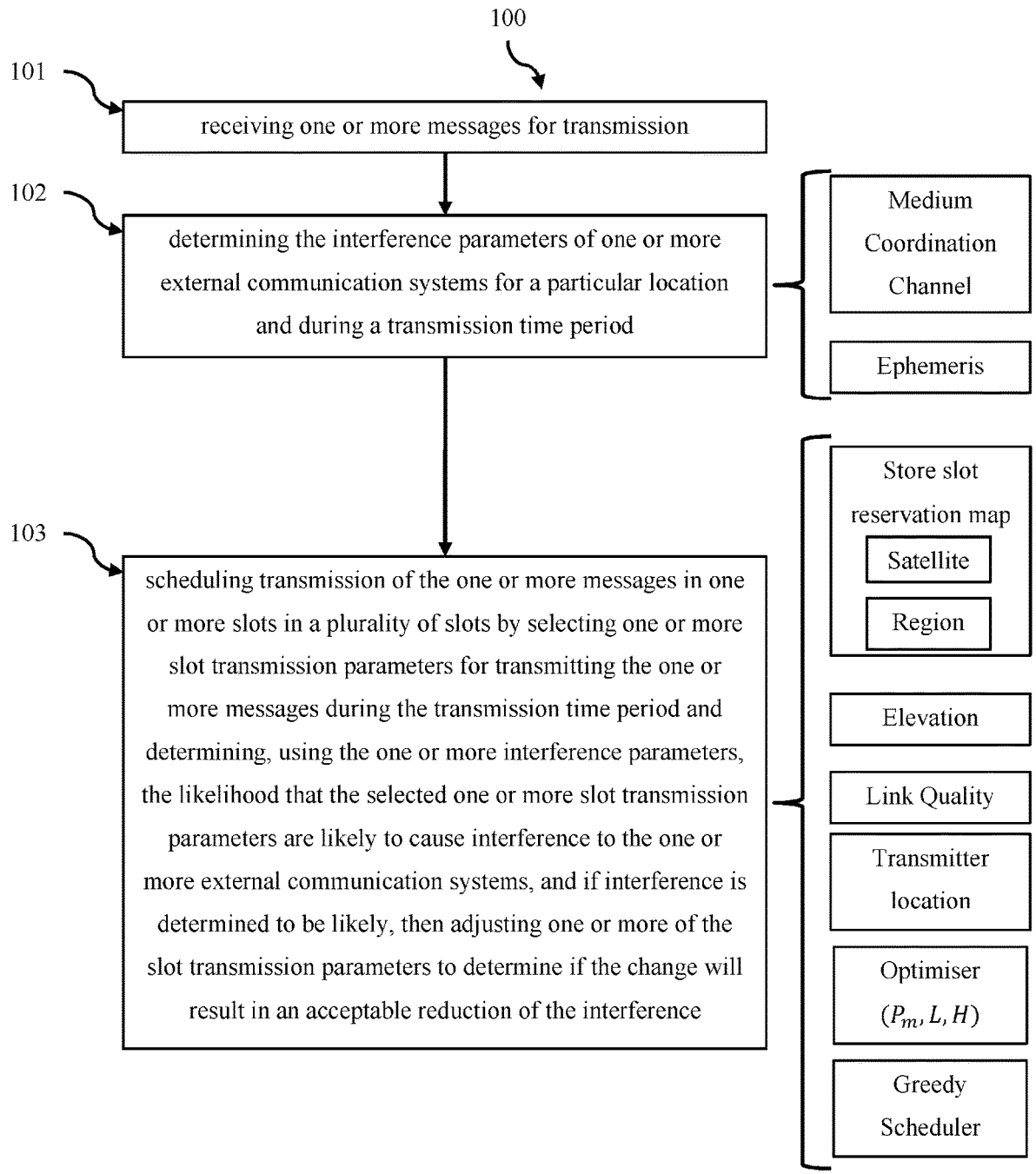
FIG. 2A is a flowchart of a method for selecting slot parameters according to an embodiment.

Referring now to FIG. 2A there is shown a flowchart of a method for selecting slot transmission parameters 100 according to an embodiment. The method may be implemented within a scheduler module of a terminal 20, an access node 10, or distributed across the communication system 1 including a scheduler 440 in the core network 400, and associated scheduler modules in access nodes 10 and terminals 20 which can communicate with the central scheduler 440 (as shown for example in FIG. 4). The system may comprise multiple access nodes 10, with at least one of the access nodes 10 having a moving field of view relative to the plurality of terminals (e.g., may be an access node located in a satellite or high altitude platform). The access node 10 and a terminal 20 communicate over a shared communications medium 13 according to an embodiment. Similarly the access node may also communicate with a gateway (i.e., a ground station), and methods described herein may be used to schedule transmissions between the access node and gateway. Similarly if the terminals and/or gateway are moving, and a terminal becomes in range of a gateway, the terminal and gateway may also use the methods described herein to schedule transmissions whilst minimizing interference to other communication systems. Similarly if a gateway is moving and it provides connectivity to an access node, e.g., a satellite or high altitude platform based gateway providing backhaul connectivity to a ground based access node, then the gateway and access node may also use the methods described herein to schedule transmissions whilst minimizing interference to other communication systems.

The shared physical communications medium 13 may be partitioned into a number of channels (or slots). These channels may be time slots in a time division multiple access system, frequency slots in a frequency division multiple access system, subcarriers in an orthogonal frequency division multiple access system, or more general slots such as spreading sequences in a code division multiple access system, etc. Transmit power and antenna polarization provide further degrees of freedom for defining a slot. Another degree of freedom may be delivered via spatial multiplexing in a spatial division multiple access system. More generally, the slots may be hybrids of any of these. A slot corresponds to some subset of the overall degrees of freedom of the system (including degrees of freedom resulting from the use of multiple transmit and or receive antennas). Regardless of the underlying method of dividing the medium into channels, we shall refer to these channels as "slots." Selecting slot transmission parameters comprises selecting one or more slot parameters (e.g., a time or frequency slot) or transmission degrees of freedom (e.g., transmission power, polarization, time, etc.). That is the combination of parameters that define a unique transmission slot. Further the slots need not be orthogonal, although in many instances slots are chosen to be orthogonal, nor are they required to have regular boundaries, e.g., they may be non-uniformly distributed in time or frequency. In one embodiment the communication system may be a communication system such as that described in International Patent Application No. PCT/AU2013/001078 titled COMMUNICATION SYSTEM AND METHOD and filed on 20 Sep. 2013 (however is it to be understood the method is not limited to this communication system).

In this embodiment one or more messages are provided to the scheduler for transmission 101. We then determine the interference parameters of one or more external communication systems for a particular location and during a transmission time period 102. Determining the interference parameters may comprise detecting, estimating and/or acquiring the interference parameters. The presence of one or more receivers in one or more external communication systems may be detected or estimated for example based on local or received data or signals. As will be described below detection may be based on detection of a beacon signal or a medium coordination channel by the transmitter, or ephemeris data may be used to estimate the location of a satellite in an external communication system (which may be subject to interference 32 from transmissions by the transmitter). The scheduler is configured to schedule transmission of the one or more messages in one or more slots in a plurality of slots by selecting one or more slot transmission parameters for transmitting the one or more messages during the transmission time period. The scheduling comprises determining, using the one or more interference parameters, the likelihood that the selected one or more slot transmission parameters are likely to cause interference to the one or more external communication systems, and if interference is determined to be likely, then adjusting one or more of the slot transmission parameters to determine if the change will result in an acceptable reduction of the interference 103. Selecting slot transmission parameters may comprise selecting a different slot degree of freedom, or adjusting a slot degree of freedom, such as reducing a transmit power or selecting a different polarization to reduce the interference. That is if the scheduler estimates a certain slot, which comprises a specific combination of slot parameters, is likely to interfere, the scheduler may alter one or more of slot parameters to determine if the change will result in an acceptable reduction of the interference. In some embodiments the selection and adjustment may be performed using optimization methods which jointly select all the slot transmission parameters in order to minimize interference or mitigate performance degradation of the other systems. As will be outlined below, the method may be implemented according to various embodiments, and may be implemented by terminals transmitting on an uplink to an access node, or access nodes transmitting on the downlink to one or more terminals.

Figure 2B:
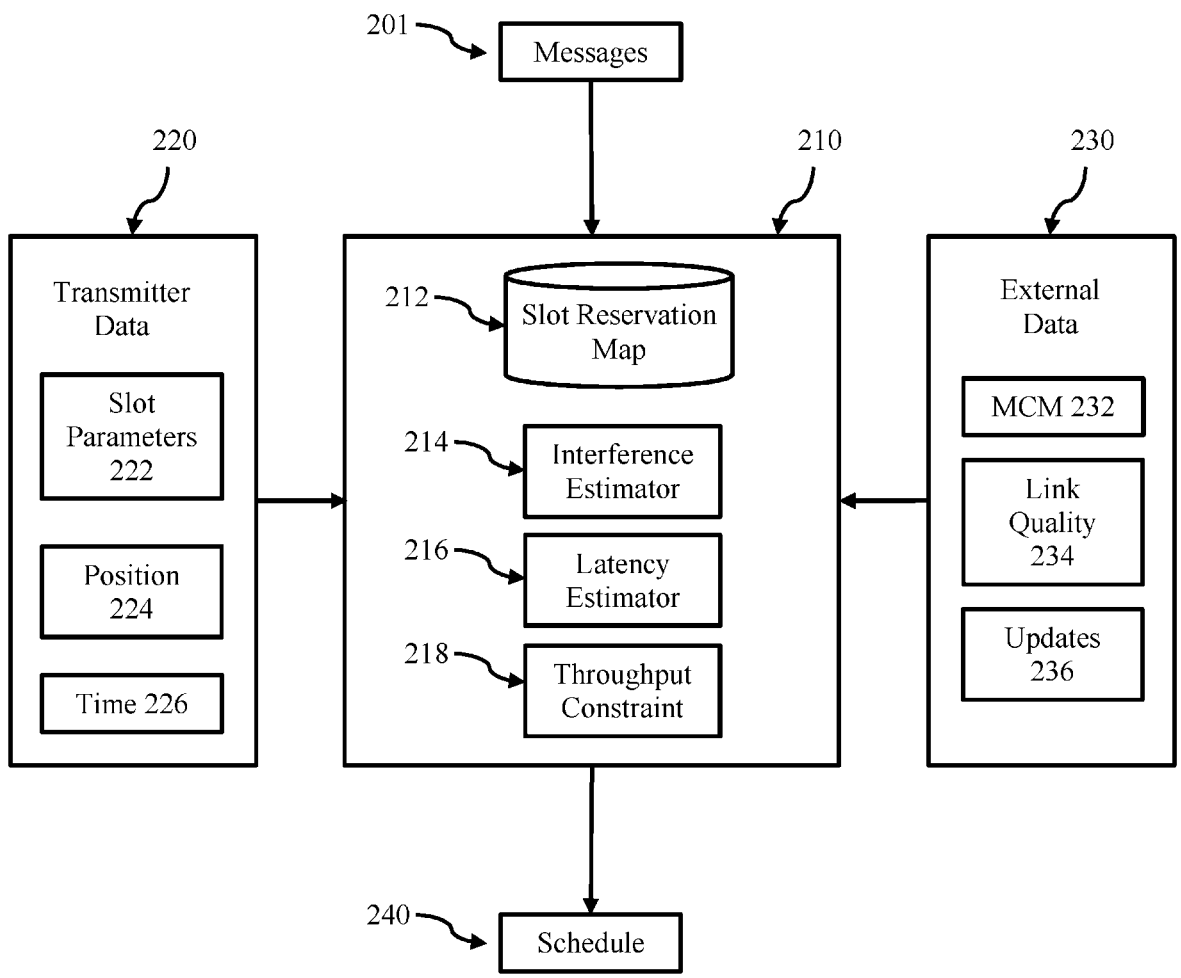
FIG. 2B is a block diagram of a scheduler according to an embodiment.

FIG. 2B is a block diagram of a scheduler according to an embodiment. The scheduler may be implemented as software code or instructions executing on a real time processor module, a FPGA and/or ASIC devices in the terminal or access node. The scheduler 210 receives one or more messages 201 for transmission 201 during a transmission time period.

The scheduler may also receive or obtain transmitter data 220 such as the available slot transmission parameters 222 (i.e., the transmission degrees of freedom), transmitter position (or location) 224 and/or time 226. In some embodiments the transmitter position, or at least the approximate transmitter position relative to one or more satellite receivers may be estimated or determined during the transmission time period (transmission window). The terminal may use a stored location, for example if the terminal is a fixed terminal which is pre-programmed with its location during installation, or if the terminal has not moved, or not moved more than a threshold amount since it last obtained a position estimate. Alternatively the terminal may include a GNSS receiver to allow it to estimate its location, or include some position determination module. In another alternative, the location of the terminal or satellites may be estimated as described in International Patent Application No. PCT/AU2017/000108 filed on 16 May 2017 and titled "POSITION ESTIMATION IN A LOW EARTH ORBIT SATELLITE COMMUNICATIONS SYSTEM." In the case of the satellite based receivers, the terminal may use ephemeris data to estimate the location of a satellite. This ephemeris data (or orbital elements) may be provided as a two-line element (TLE) which models the orbit of a satellite, and which may be transmitted by the satellite or another transmitter, and stored by the terminal. In some embodiments the terminal may calculate or store extended ephemeris data for a satellite using the methods described in International Patent Application No. PCT/AU2017/000286 titled SYSTEM AND METHOD FOR GENERATING EXTENDED SATELLITE EPHEMERIS DATA and filed on 21 Dec. 2017. These extended ephemeris data may be valid for time periods of a year or more.

Figure 1B:
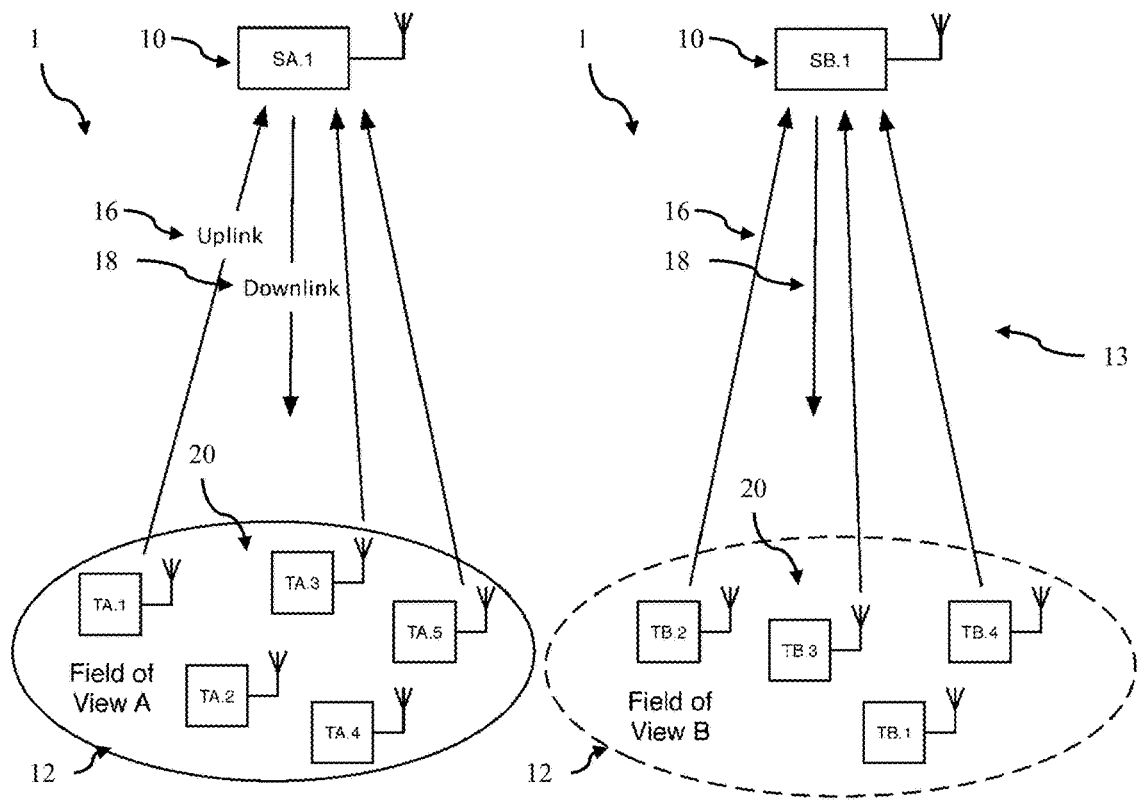
FIG. 1B shows a schematic diagram of two satellite communications systems with overlapping fields of view according to an embodiment.
Figure 1B:
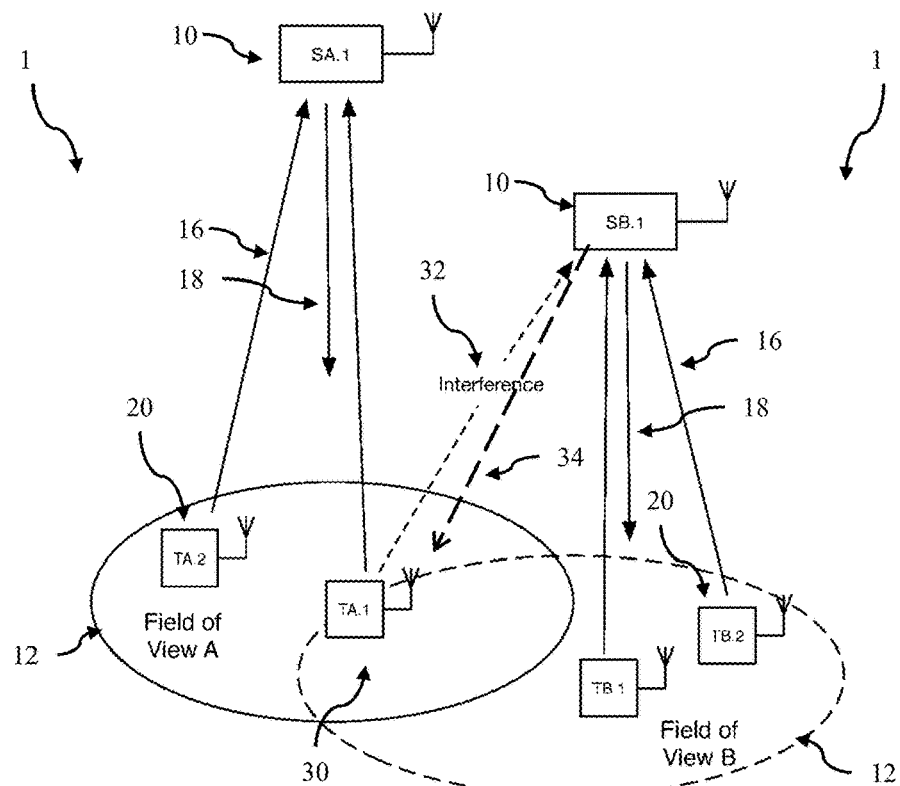

The scheduler is configured to adapt its operation upon determining (e.g., by direct detecting, estimating or acquiring) the presence of an external system, e.g., the case shown in FIG. 1B in which TA.1 of system A also exists in the field of view of satellite SB.1 of external system B. The terminal may estimate the presence of the satellites using ephemeris data, combined with knowledge of the transmitter location and time, or the satellite may transmit a beacon 34 signaling its presence to terminals within its field of view using methods such as those described in International Patent Application No. PCT/AU2013/001079 titled MULTI-ACCESS COMMUNICATION SYSTEM and filed on 20 Sep. 2013. Such a beacon 34 may be transmitted on a channel that is cooperatively shared by systems A and B, and potentially other systems, using known techniques, which we will refer to as a Medium Coordination Channel 232. The Medium Coordination Channel 232 may also be used to transfer information to assist in sharing the medium, such as link quality, channel state, signal to noise, interference levels, power levels, etc. The beacon signal characteristics may also be used by the terminal as an input to estimate the likelihood of interference. For example, the terminal may use a receive signal strength metric derived from the beacon to estimate channel loss between the terminal and satellite, and use this when estimating interference potential at the external satellite. Some systems may transmit beacon signals without a dedicated Medium Coordination Channel, and other systems may use a Medium Coordination Channel without a beacon.

Upon detecting the presence of one or more external systems the terminal scheduler adapts its use of slots in the shared medium. In one embodiment the terminal ceases to use slots that are reserved for use by the external system. This information may be obtained from a Slot Reservation Map 212 that is stored locally in terminal memory, and may be updated from time to time (e.g., via updates 236). The Slot Reservation Map contains slot reservation information for the uplink, downlink, or both. The slots are considered by the scheduler as being likely to cause interference to the one or more external communication systems and thus the scheduler prevents allocation of the reserved slots or otherwise selects one or more slot parameters (i.e., slot degrees of freedom) to mitigate interference. Slots may be reserved on a per satellite basis in which case allocation is only prevented if the associated satellites is detected or estimated to be present. Slots may also be reserved on a per-geographic region basis, in which case allocation is prevented if the transmitter is determined (e.g., estimated via GPS) estimated to be located within the respective geographic region. In some embodiments this could be relaxed, and the slot reservation map may store information relating to the probability or likelihood of interference. The scheduler may thus adjust transmitter behavior (i.e., slot transmission parameters) to avoid interference, e.g., by reducing transmit power. The scheduler may aim to minimize transmit power while maintaining a value that is considered high enough to achieve some probability of successful reception, and/or select a transmit power that is considered low enough such that interference into the one or more external communication systems is unlikely, or at least less than a threshold. The scheduler may use various optimization methods to select slot transmission parameters.

The Slot Reservation Map 212 may be updated by one or more satellites via the Medium Coordination Channel, or via another communication link to the terminal, e.g., if the terminal also has terrestrial or secondary satellite communication capabilities. The Slot Reservation Map 212 may be dependent upon geographic location of the terminal (or transmitter), i.e., reservations are per-geographic region, and what is applied in one geographic region may differ from another geographic region. The Slot Reservation Map 212 may reserve slots at a system level, or at a sub-system level, such as per-satellite. In an embodiment the Slot Reservation Map may divide a shared spectrum resource between multiple systems, informing the terminal to vacate spectrum reserved for an external system upon detecting the presence, or likely presence, of a satellite from that system during the transmission period.

In another embodiment the Slot Reservation Map may contain reservation information for a plurality of satellites, allowing the systems to adapt per satellite, or per group of satellites, e.g., being grouped due to having common operational capabilities. In other embodiments the Slot Reservation Map may divide the shared medium using any degree of freedom of the system, or any combination thereof. For example reservations may be defined for geographical regions, e.g., via geofence polygons, potentially in combination with division based on frequency and/or time. Slots may be allocated geographically using methods such as those described in International Patent Application No. PCT/AU2013/000895 titled CHANNEL ALLOCATION IN A COMMUNICATION SYSTEM and filed on 14 Aug. 2013. Slot allocation, and the communication of slot allocation information, may be performed using methods such as those described in International Patent Application No. PCT/AU2015/000743 titled MULTICARRIER COMMUNICATIONS SYSTEM and filed on Sep. 12, 2015.

Referring back to the example shown in FIG. 1B, in one embodiment, when terminal TA.1 detects the presence of satellite SB.1, it consults its Slot Reservation Map (optionally based on knowledge of its location) and the scheduler 210 reduces the bandwidth of operation for communication with satellite SA.1 in order to reserve bandwidth for the operation of system B. In another embodiment, after consulting the Slot Reservation Map 212, the scheduler 201 in terminal TA.1 schedules transmissions to allow time for system B to operate.

In another embodiment the terminal may select slot transmission parameters in order to operate in coexistence with the external system while in the field of view of satellites from both systems. In the example shown in FIG. 1B, satellite SA.1 is at high elevation in relation to terminal TA.1, resulting in a short link distance. In contrast TA.1 is on the edge of the field of view of satellite SB.1, resulting in a much longer link distance. Transmissions from TA.1 are therefore expected to have significantly higher receive signal strength at SA.1 relative to SB.1, and the interference from TA.1 presented at SB.1 may be tolerable (or estimated to be tolerable). Thus in one embodiment the terminal continues to operate without adapting behavior to account for the presence of an external satellite until the elevation of the satellite from the external system crosses some elevation threshold at which the terminal considers itself to be an interference threat to the external system. This may be 5, 10, 15 degrees or more. The elevation threshold may be determined offline, e.g., via simulation and/or analysis of tolerable inter-system interference, or may be derived from system performance data obtained during operation. The threshold may be stored in memory and updated from time to time, e.g., via the system downlink, or via the Medium Coordination Channel. In another embodiment messages are scheduled for transmission during one or more ranges of elevation. The ranges may be stored or calculated during operation. The scheduler may use antenna gain pattern and orientation information for the terminal and/or satellites (internal and/or external) to determine one or more elevation ranges. The elevation range information may be determined offline, e.g., via simulation and/or analysis of tolerable inter-system interference, or may be derived from system performance data obtained during operation. Elevation ranges and antenna gain pattern and orientation information may be stored in memory, e.g., in the Slot Reservation Map, and updated from time to time, e.g., via the system downlink, or via the Medium Coordination Channel.

In another embodiment the terminal estimates the probability of successful reception at the target receiver, and the level(s) of interference that it may present to one (or more) external receivers. The scheduler may adjust the transmit power level to achieve a desired probability of reception while operating within tolerable limits of interference for the external system. That is to mitigate performance degradation if the likelihood exceeds a threshold. Limits on tolerable interference may be stored by the terminal in the Slot Reservation Map, and may be provided via the Medium Coordination Channel. Estimation of probability of receive success may account for potential interference from other terminals that are in the field of view of the target receiver. The target receiver may provide the terminal with information on expected interference levels and other link quality characteristics using techniques such as those described in International Patent Application No. PCT/AU2018/000151 titled SYSTEM AND METHOD FOR PREDICTION OF COMMUNICATIONS LINK QUALITY and filed on 28 Aug. 2018.

In another embodiment determining if a transmission is likely to cause interference comprises jointly estimating a probability of error that a transmission is not received (or equivalently successful reception) at a target receiver and the level of interference to one or more receivers in one or more external communication systems during the transmission time period. In some embodiments determining if transmission in a slot is likely to cause interference comprises estimating a time varying estimate of inference over the transmission time period.

In some embodiments this estimation may be performed using an optimization method. Optimization methods are typically configured to optimize one or more objective functions, e.g., targeting maximum probability of reception (or minimum error rate), minimum (or some tolerable level of) interference into one or more external satellites (potentially from different systems), minimum power consumption, and/or maximum data rate. Variables to be optimized represent the degrees of freedom offered by slots. Examples include schedule (transmit time and/or frequency), transmit power, spatial parameters (e.g., azimuth and elevation of a satellite relative to a terminal for a single transmission or across multiple transmissions. In other embodiments optimization may be performed using a greedy scheduling algorithm, or similar method that is computationally simple.

Embodiments of the above methods will now be discussed in further detail. We first consider a packetized communication system that aims to convey a set M of messages. The communication channel is supposed to be time varying such that a packet transmitted at time t has probability p(t) of failing to be received. This could also be referred to as the probability of error or probability of failure, and is related to the probability of success=(1−p(t)). More generally if K packets are transmitted at times $t_1, \ldots, t_K$ the probability that none of the K packets are received is supposed to be $p(t_1, \ldots, t_K)$. This probability function p can account for a wide variety of time varying phenomena affecting the communications system. For example, in a satellite communication system it might account for the varying visibility of orbiting satellites. It might also account for physical obstructions, such as walls, between the satellite and transmitter. It might also account for the current system load, that is, the probability of error p(t)) might be larger if the communications system is under heavy load at time t and smaller if the load is light. In what follows it is assumed that the transmitter knows the function p. Methods for modelling and estimating p are described in International Patent Application No. PCT/AU2018/000151 titled SYSTEM AND METHOD FOR PREDICTION OF COMMUNICATIONS LINK QUALITY and filed on 28 Aug. 2018. The function p is typically terminal (transmitter) specific. That is, each transmitting device estimates or is provided with its own p. This accommodates, for example, transmitters that are in different locations.

Each message in M may be transmitted multiple times so as to increase the probability that it is correctly received at least once. Let $t_{m,1}, t_{m,2} \ldots$ be the sequence of times at which the message m ∈ M is transmitted. For each message M, the transmitter aims to choose the number of repetitions K(m) and the times $t_{m,1}, \ldots, t_{m,K(m)}$ such that the probability that m is not received satisfies:

$$p(t_{m,1}, \ldots, t_{m,K(m)}) \leq \rho_m, \text{ for all messages } m \in M. \quad (1)$$

The target probability of error $\rho_m \in [0,1]$ is free to be chosen and may depend on the message m. We refer to (1) as the probability constraint in what follows. While we state p as a probability in general p may be any measure of "badness" when transmitting at times $t_1, \ldots, t_K$. In this way the constraint (1) can be used to implement any desired quality of service metric. Another metric we consider in this work is latency, defined as the time between when a message is created and when it is received by the satellite. Since terminals may not be able to receive direct acknowledgements from the satellite, probabilistic measures of latency will be considered.

Even more generally the variables $t_{m,1}, t_{m,2}, \ldots$ need not strictly be times but can be any combination of the degrees of freedom of the communications channel. For example, we may wish to optimize over both time and frequency in which case $t_{m,n}$ would be replaced by a pair of the form $(t_{m,n}, f_{m,n})$.

A wide number of degrees of freedom (i.e., slot transmission parameters) exist in communications channels such as antenna polarization, space/location, transmit power, or spreading sequences in a code division multiple access system. For the sake of simplicity of exposition we refer to the $t_{m,1}, t_{m,2}, \ldots$ as times in what follows, but the optimisation problems and algorithms we derive can be applied in the more general setting in a straightforward manner. We discuss generalizations of this form below. While the variable to be optimized need not be time alone it is typical that at least one of the variables is time. In some embodiments discussed below the aim is to achieve the probability constraint (1) and reduce latency but simultaneously aim to reduce a more general time varying measure of the interference generated by transmissions.

We will first develop interference models. We will model time varying interference by a function h(t) that measures the level of interference caused to external communication systems by transmission of a packet at time t. The interference h(t) is typically terminal (transmitter) specific. That is, each transmitting device estimates or is provided with its own h(t). This accommodates, for example, transmitters that are located differently. The interference h(t) may be determined in various ways. For example, in a satellite communication setting it might vary in relation to the elevation φ(s, t) or range r(s, t) of satellites s within external satellite communication systems. For example, the interference might be modelled as:

$$h_s(t) = \begin{pmatrix} 1 & \phi(s,t) < 0 \\ 1 - \alpha \log(r(s,t)/r_0) & \phi(s,t) \geq 0 \end{pmatrix} \quad (2)$$

where $r_0$ is the range of the satellite at zero elevation and α>0 is a constant that is free to be chosen and may depend on the satellite s. Observe that $r_0 = \sqrt{a_s^2 + 2a_s r_e}$ where $a_s$ is the altitude of the satellite and $r_e$=6378 is the radius of Earth. The logarithmic term occurring in (2) models the path loss between the module and the external satellite. If there are multiple external satellites the interference may be modelled by, for example, the sum:

$$h(t) = \Sigma_{s \in E} h_s(t) \quad (3)$$

or by some other combination, for example, the maximum $h(t) = \max_{s \in E} h_s(t)$ where E is the set of external satellites. In practice one might measure the interference h(t) from empirical observations and select models based on these observations.

We seek transmit times that minimize or constrain the interference overall. Various optimization metrics can be used to achieve this. For example, we could choose to minimize the sum:

$$Z_{m \in M} \Sigma_{n=1}^{K(m)} h(t_{m,n}). \quad (4)$$

or some other weighted average of the h(t). Alternatively we could choose to minimize the maximum interference:

$$\max_{m \in M} \max_{n=1,\ldots K(m)} h(t_{m,n}). \quad (5)$$

In what follows we denote the chosen interference metric by H. The algorithms we describe below can be applied to any metric used to define the overall interference.

We now consider mechanisms for measuring the latency, that is, the time required for a message m ∈ M to be received. Let $\tau_m$ be the time at which the message m ∈ M is created. We will suppose that the times at which m is transmitted $t_{m,1}, \ldots$ are in ascending order. If the first transmission $t_{m,1}$ is received then the latency takes the value $t_{m,1}-\tau_m$. This is the smallest possible latency for the message m. This smallest latency occurs with probability $1-p(t_{m,1})$. In general the latency takes the value $t_{m,n}-\tau_m$ with probability:

$$p(t_{m,1}, \ldots, t_{m,n-1}) - p(t_{m,1}, \ldots, t_{m,n}) \quad (6)$$

where we employ the convention $p(t_{m,1}, \ldots, t_{m,0})=1$ that can be interpreted as stating that the probability of failure when message m has not been transmitted at all is 1. Observe that the difference:

$$p(t_{m,1}, \ldots, t_{m,n-1}) - p(t_{m,1}, \ldots, t_{m,n}), n>0 \quad (7)$$

is the probability that the transmissions at times $t_{m,1}$, $t_{m,n-1}$ fail while that at time succeeds.

The cumulative distribution of the latency for message m is:

$$F_m(l) = \Sigma_{n|t_{n,m}\tau_m < l < 1}^{K(m)} p(t_{m,1}, \ldots, t_{m,n-1}) - p(t_{m,1}, \ldots, t_{m,n}) \quad (8)$$

where the sum is over all those n=1, ..., K(m) such that the corresponding transmit times $t_{m,n}-\tau_m<l$. The distribution of the latency of all messages is then:

$$F(l) = \frac{1}{M} \sum_{m \in M} F_m(l). \quad (9)$$

Any statistic derived from this latency distribution can be used for the purpose of choosing transmit times. For example, we might desire that 100a % of messages be received within time b and so impose the following constraint on the percentile:

$$F(b) \le a. \quad (10)$$

Another possible metric is the expected value of the latency under the assumption that the message is received. The expected latency of the message m is $D(t_{m,1}, \ldots, t_{m,K(m)}, \tau_m)$ where $$D(t_1, \ldots, t_K, \tau) = \frac{1}{1 - p(t_1, \ldots, t_K)} \sum_{n=1}^{K} (p(t_1, \ldots, t_{n-1}) - p(t_1, \ldots, t_n))(t_n - \tau). \quad (11)$$

Taking the average of these expected values over all messages we obtain the overall expected latency:

$$\frac{1}{M} \sum_{m \in M} D(t_{m,1}, \ldots, t_{m,K(m)}, \tau_m). \quad (12)$$

In what follows we denote the chosen latency objective by L. For example, if we desire to minimize or constrain the expected latency we set L equal to (12). If we desired to minimize or constrain a percentile of the latency we set L=F(b) for some target latency b as in (10). The algorithms we devise below will be applicable in both of these cases and others.

Before deriving specific optimization problems that minimize or constrain interference we introduce a practical constraint on transmissions. We suppose there is a minimum time W between consecutive transmissions, that is:

$$|t_{m,i} - t_{n,j}| \ge W \quad (13)$$

for all m, n∈M and i, j>0 where either m≠n or i≠j. The minimum time W is related to the throughput, that is, the rate at which transmission can occur and so we refer to (13) as the throughput constraint in what follows. Smaller W corresponds with larger throughput. In practice W is typically at least as large as the duration of a packet and is often made even larger to accommodate, for example, heat dissipation in radio hardware. The value of W may also be set to satisfy a duty cycle constraint, e.g., to meet a regulatory requirement.

To simplify our notation we let $P_m = p(t_{m,1}, \ldots, t_{m,K(m)})$ so that the probability constraint (1) can be written $P_m \le \rho_m$ for m∈M. For each message m∈M we seek a number of repetitions K(m) and transmit times $t_{m,1}, \ldots, t_{m,K(m)}$ that correspond with small probability of error $P_m$, small latency L, and also small interference H. This can be achieved in various ways. For example, we could choose to minimize interference subject to constraints on the probability of error and latency, that is, we seek a solution of the form:

$$\begin{aligned} & \min H \\ & \text{subject to } P_m \le \rho_m, m \in M \\ & L < \rho_L. \end{aligned} \quad (14)$$

Alternatively we might seek to minimize the latency subject to constraints on the interference and probability of error, that is we seek a solution of the form:

$$\begin{aligned} & \min L \\ & \text{subject to } P_m \le \rho_m, m \in M \\ & H < \rho_H. \end{aligned} \quad (15)$$

More generally we might simply seek any solution satisfying constraints, that is, any times satisfying:

$$L < \rho_L$$

$$P_m \le \rho_m, m \in M$$

$$H < \rho_H. \quad (16)$$

The algorithms we describe below apply in all of these cases and others.

Before describing algorithms we now consider a more general scenario where multiple, say N, external communication systems exist and we seek to minimise or constrain the interference caused to each separately. We denote by $h_n(t)$ the interference caused to the nth system by transmission of a packet at time t. For example, in a satellite communication setting we might define:

$$h_n(t) = \Sigma_{s \in E_n} h_s(t) \quad (17)$$

where $E_1, \ldots, E_N$ are the set of satellites for each of the external systems. We denote the overall interference caused to the nth system by $H_n$. The overall interference might be defined by, for example, the sum:

$$H_n = \Sigma_{m \in M} \Sigma_{n=1}^{K(m)} h_n(t_{m,n}) \quad (18)$$

or by some other combination of the $h_n(t)$. The optimization problems above can be redefined so as to constrain the interference caused to each system. For example, (15) would now be:

$$\begin{aligned} & \min L \\ & \text{subject to } P_m \le \rho_m, m \in M \\ & H_n < \rho_{H,n}, n = 1, \ldots, N. \end{aligned} \quad (19)$$

where $\rho_{H,n}$ is the constraint chosen for the nth external system. The algorithms described in the next section are applicable to this setting.

A wide range of algorithms can be used to solve or approximately solve the optimizations problems formulated above. Here we consider solutions that apply under the simplifying assumption that the transmit times take the form iW for integers i, that is, we restrict the transmit times to a discrete grid of width W. The throughput constraint (13) is automatically solved under this assumption. We also make the assumption that all messages should be transmitted within some time interval T. In this case, we now seek the transmit packets at times from the finite set:

$$J=\{iW|i\in\mathbb{Z}\}\cap T. \quad (20)$$

The interval T defines the block of time considered for optimisation and hence also defines the interval for which constraints on external interference are evaluated. In practice the interval T can be chosen large relative to the desired latency L. The interval may also shift forward with the current time and the preferred transmit times can be recomputed, to ensure continual scheduling while satisfying the interference constraints for all time.

Because the set of times J is finite the optimisation problems become combinatorial. Solutions can be found using well-known methods such as brute force or iterative approaches that optimize all transmit times jointly. Optimization algorithms include simulated annealing or genetic algorithms, (although other algorithms may be used). Both approaches randomly perturb the current selection of transmit times and evaluate the cost of the current selection. Some perturbations may include:

a. increase or decrease transmit time, i.e., $t_{m,n}^{next}=t_{m,n}\pm W$
b. include new time in randomly selected pass
c. randomly remove transmit time
d. swap messages assigned to randomly selected pair of transmit times Another approach seeks to either represent or approximate the constraints with linear functions. The resulting optimization problems then fit within the framework of integer linear programming and can be solved using well known techniques such as the simplex algorithm, relaxation methods, and or methods making use of the Karush-Kuhn-Tucker (KKT) conditions.

Observe that these approaches can be applied in the more general setting where we desire to optimize parameters other than just time. For example, suppose we desire to choose a time t and spreading sequence s for each packet transmitted. In this case we optimize over pairs of the form:

$$(t_{m,n},s_{m,n}) \quad (21)$$

where $t_{m,n}$ is the time at which the nth repetition of message $m\in M$ is transmitted and $s_{m,n}$ is the spreading sequence used for this transmission. Let S be the set of spreading sequences. We now consider the finite set J to be:

$$J=\{(iW,s)|i\in\mathbb{Z},iW\in T,s\in S\}. \quad (22)$$

All of the optimization problems considered above in relation to interference models can be trivially extended to this setting and the same standard algorithms, such as brute-force and simulated annealing, can be used to find solutions. In this way our solution can be made to optimize over any set of degrees of freedom in the communication channel. Examples include, but are not limited to frequency, antenna polarization, space/location, transmit power, or spreading sequence.

As a further example we will describe the construction of an optimization problem as a linear program allowing solving/optimization using linear program algorithms such as the simplex method to obtain/select slot transmission parameters for a terminal at particular transmission location and during a transmission time period. Thus in the following there is a dependency on geographic location and time which will be omitted to preserve clarity. The scheduling problem can also be considered a resource allocation problem and can be performed jointly for multiple messages.

Let there be K "slots" being considered in the optimization problem. For each of these slots k=1; 2, . . . , K we want to make a selection of slot transmission parameters $x_k$ (i.e., a resource allocation). The slot transmission parameters could represent a slot selection ($x_k \in \{0,1\}$, a binary variable), power ($x_k \in [0, P_k]$ for some per-slot power constraint $P_k$), or some other transmission degree of freedom as described above. Let $x=(x_1, x_2, \ldots, x_K)$ represent the vector of slot transmission parameters (resource allocations) and let $a=(a_1, a_2, \ldots, a_K)$ be a "utility vector" which for each slot represents a measure of the utility $x_i \cdot a_i$ of that slot. Note that a is specific to a particular terminal, and varies with geographic location and time. The vector a can also incorporate time- and location varying system performance factors, such as system load, which affect the probability of error/success. Factors which can affect the individual $a_i$ include satellite range, and elevation, regional interference and noise, system load in the region, as well as local environmental features (e.g., obstacles). As discussed above these can be provided to the terminal by a downlink communications channel, or can be estimated by the terminal itself (based on its on board orbital models, a sky view model, and previous success metrics such as those obtained from acknowledgements), or a hybrid of downlinked and local information. For example, let $p_k$ be the probability of failure/error for slot k. The probabilities could be measured, or estimated, including by estimating the probability of success ($=1-p_k$) as discussed above, either by the terminal or they are provided to the terminal (or scheduler). Either way, they are provided to the terminal somehow. Then for a terminal with (binary) slot allocations $x_k$, the overall probability of failure assuming independent events across slots, is $\Pi_k x_k p_k$. Let $a_k=-\log(p_k)$ then we can optimize the inner product (x, a) noting exp(x, a)=exp $\Sigma_k x_k a_k$=exp $\Sigma_{k:x_k}=\log(p_k)=\Pi_{k:x_k=1}(p_k)$.

Alternatively we can mode the at as channel gains, and the $x_i$ as power allocations, in which case (x, a) is the total received power, another useful objective function for an optimization problem. In the case that the "slots" k=1, 2, . . . , K are time slots and [K]=(1, 2, . . . , K), then (x, [K]) is proportional to the average delay. Further, if 1=(1, 1, . . . , 1), the all-one vector, then (x, 1) either counts the number of slots used (for binary x), or measures the total power for the case that the xtrepresent power allocations.

Suppose there are S external systems. Let $h_j=(h_{j1}, h_{j2}, \ldots, h_{js})$ represent the "penalty vector" where $h_{js}$ measures the amount of detriment (e.g., interference) experienced by external system j=1, 2, . . . , S, in slot j=1, 2, . . . , K. For each external system we will define a penalty tolerance parameter $\beta_j$ which represents the amount of interference that the system can accommodate. The $\beta_j$ could be measured or estimated by the terminal or system, or could be provided by the external system. One way of estimating these is for the main system to actually decode the external system signals and measure the probability of success. These estimates could then be provided to the terminal via a communications channel. The terminal could also estimate the $\beta_j$ via observation of signals transmitted by the external system. Hybrids of these approaches are also possible. The j can also depend on the orbital parameters of the external system, and as part of our approach, these orbital parameters can be provided to the terminal, allowing the terminal to contribute to the estimation of $\beta_j$ by computing predictions for the range and elevation of the external system satellites. A reminder that the $\beta_j$ depend on both time and geographic location, and are specific to a particular terminal at a particular time (e.g., can also depend on a sky view map, particular terminal antenna and power levels, etc.). We can thus consider a number of different optimization problems.

The first case is maximum utility. As an example, let a be the vector of log probabilities described above, and we construct the optimization problem as minimizing the probability of failure subject to interference limits $\beta_j$, a maximum number K' of slots used, and limit L' on average latency (or average delay):

$$\min(a, x) \quad (23)$$

subject to $$x_k \in \{0, 1\} \quad k = 1, 2, \ldots, K$$

$$(x, [K]) \leq L'$$

$$(x, 1) \leq K'$$

$$(h_j, x) \leq \beta_j \quad j = 1, \ldots, S$$

This is an integer linear program and for which there is a vast literature on methods for solving or approximating the solutions to such problems. One approach can be to relax the binary constraint on the $x_k$, which results in a linear program:

$$\min(a, x) \quad (24)$$

subject to $$0 \leq x_k \leq 1 \quad i = 1, 2, \ldots, K$$

$$(x, [K]) \leq L'$$

$$(x, 1) \leq K'$$

$$(h_j, x) \leq \beta_j \quad j = 1, \ldots, S$$

which can be solved optimally with the simplex algorithm or via interior point methods. Other methods can be found by seeking a solution to the Karush Kuhn Tucker equations (or an algorithm based on, e.g., iterative solution to KKT), noting that the objective function in all cases is linear and hence differentiable and convex. Noting that the solution will be a vertex of the feasible region, the optimal $x_k$ will only be non-binary if some other constraint bites harder than the constraints on the $x_k$. If a non-binary solution is found for one of the $x_k$, one approach can be to round it to 0 or 1, whatever is closer. Alternatively, we can consider similar optimizations as above where we are maximizing total received power (x, a) where the a now models channel gains.

Another similar optimization approach is to minimize the average latency (or average delay) whilst adding in a constraint on failure probability a:

$$\min(x, [K]) \quad (25)$$

subject to $$x_k \in \{0, 1\} \quad i = 1, 2, \ldots, K$$

$$(a, x) \leq \alpha$$

$$(x, 1) \leq K'$$

$$(h_j, x) \leq \beta_j \quad j = 1, \ldots, S$$

Another similar optimization approach is to minimize the total penalty/interference:

$$\min \sum_j (x, b_j) \quad (26)$$

subject to $$x_k \in \{0, 1\} \quad i = 1, 2, \ldots, K$$

$$(a, x) \leq \alpha$$

$$(x, [K]) \leq L'$$

$$(x, 1) \leq K'$$

Alternatively, we could optimize for one of the penalties $(x, b_j)$, and have the other penalties as part of the constraints. Another approach is to optimize a weighted sum of penalties $\Sigma_j c_j(x, h_j)$ where $c_j$ represents the sensitivity of each external system. These $c_j$ could also just be absorbed into each $h_j$. Other variations are possible by shuffling around different constraints vs objectives. Similar optimization problems can be formulated where the $x_k$ are power allocations (or some other per-terminal cost parameter) and we either place constraints on total power (total cost) $(x, 1) \leq P$, and per-slot power (cost) $x_k \leq P_i$ or optimize for power, i.e., min(x, 1) subject to similar constraints as before. The objective functions in any of the above optimization problems can be replaced with non-linear functions, and KKT methods and/or well-known methods for non-linear optimization can be applied, including the use of convex functions.

Another example allows for dependence between slot successes in a probabilistic model is to consider quadratic objective functions such as x'Ax where A is a covariance matrix (for example from a joint Gaussian distribution) and x' is transpose. For positive definite A these also admit computationally simple solutions. Another approach is to take linear approximations (e.g., via Taylor expansion) of nonlinear objective functions. Note that in all of these optimization problems there is no concept of preventing allocation to a particular slot. Such allocations emerge naturally, if required, subject to the constraints as solutions in which $x_k$=0. If there are hard constraints from external systems prohibiting allocation to a slot (e.g., reserved slots in a slot database), these slots can be removed a-priori from the set of slots being considered by the optimization problem.

An alternative to jointly optimizing all transmit times is a greedy algorithm that selects transmit times sequentially. The greedy scheduler makes use of a particular ordering of time. We prefer to schedule transmissions at times that decrease the latency and probability of error whilst minimally increasing the interference. Given a list of times $\ell = (t_1, \ldots, t_K)$ we let $p(\ell)$ be the probability evaluated at times in the list, that is:

$$p(\ell) = p(t_1, \ldots, t_K). \quad (27)$$

We similarly let $$p(\ell, t) = p(t_1, \ldots, t_K, t) \quad (28)$$

denote the probability after the addition of time t to the list $\ell$.

A greedy approximation can apply to any of the cost functions described above. Here we describe an algorithm to minimize the mean latency (12) and total external interference (4). We define a function q to capture the optimisation trade-offs:

$$q(\ell, t, \tau) = f_L(D'(\ell, t, \tau)) + f_P\left(\frac{p(\ell, t)}{p(\ell)}\right) + f_H(h(t)) \quad (29)$$

where $D'(\ell, t, \tau)$ is the difference between the expected latency given transmission at times $\ell \cap \{t\}$ and the expected latency given times $\ell$ alone supposing the message transmitted at these times was created at time T. Specifically:

$$D'(\ell, t, \tau) = D(\sigma_1, \ldots, \sigma_{K+1}, \tau) - D(\gamma_1, \ldots, \gamma_K, \tau) \quad (30)$$

where $\sigma_1, \ldots, \sigma_{K+1}$ are the times from $\ell \cap \{t\}$ sorted in ascending order and $\gamma_1, \ldots, \gamma_K$ are the times from $\ell$ sorted in ascending order. The functions $f_L$, $f_P$ and $f_H$ are free to be selected. For simplicity we suppose these functions to be constants:

$$f_L(x) = 1, f_P(x) = a, f_H(x) = b \quad (31)$$

in what follows. This comes with no loss of generality as the greedy algorithm can be applied for arbitrary $f_L$, $f_P$, and $f_L$. The function q then takes the form:

$$q(\ell, t, \tau) = D'(\ell, t, \tau) + a\frac{p(\ell, t)}{p(\ell)} + bh(t). \quad (32)$$

The heuristic $q(\ell, t, \tau)$ is used by the greedy algorithm to make local decisions about the next message and the next time to transmit. Times are selected until either the interference constraint is violated or the probability constraint (1) is satisfied. We now give some intuition for selection of the constants a and b, or equivalently, the function $f_L$, $f_P$, and $f_H$. Large b will penalise interference so the scheduler will favour times where little interference is caused, i.e., where h(t) is small. This will allow more repetitions of each message before the interference constraint is reached. The number of repetitions relates to the energy consumption of the transmitted and can be implicitly included in the interference term be choosing h(t)>0 even when no external interference occurs. This done, for example, in the satellite model of interference $h_s(t)$ from (2) where $h_s(t)=1$ even when the satellite s is not visible. Large a will aim to schedule to satisfy the probability constraint, which will result in fewer repetitions and reduced energy consumption. Reduced repetitions may also reduce the total interference H. Finally the expected latency term L(m) will favour earlier times with sufficiently high probability. These suggest that a wide variety of scheduling procedures can be derived by appropriately setting constants a and b.

Algorithm 1

| Greedy Procedure for Selecting Transmit Times | |
|---|---|
| 1 | create empty lists $t_m$ for each m ∈ M |
| 2 | let t(n) = $\operatorname{argmin}_{j \in J} q(t_n, j, \tau_n)$ for (best time for message n) each n ∈ M |
| 3 | set m = $\operatorname{argmin}_{n \in M} q(n, t(n), \tau_n)$ (message to schedule next) |
| 4 | exit if H > $\rho_H$ (interference constraint violated) |
| 5 | add time t(m) to list $t_m$ |
| 6 | if $p(t_m) \leq \rho_m$ remove m from M. |
| 7 | exit if M is empty (target probabilities reached) |
| 8 | remove t(m) from J |
| 9 | exit if J is empty (no more transmit opportunities) |
| 10 | go to step 1 |

Algorithm 1 begins with a list of messages M and candidate transmit times J and returns a list of preferred transmit times for each message. Lines 2 and 3 in the procedure select the transmit time and message that minimizes q. Should two messages result in the same value of q(n, t(n), $\tau_n$) in the minimisation occurring on line 3 then that message for which the ratio $p(t_m)/\rho_m$ is largest is used. In this way messages farthest from their target probability $\rho_m$ (measured as a ratio) are preferred, all else being equal. Before adding the selected time to the list, line 4 calculates the interference metric H and exits if the interference is above the tolerable level. In this case, no more transmissions can be scheduled in the interval of time T. Line 6 uses the updated list of transmit times and checks if the current message has sufficiently small probability of not being received. When the target probability is reached, the message is removed from set of messages M and no longer considered by the algorithm. After each transmit time is selected, it is removed from the list of candidates times J on line 8. The algorithm continues until there are no more messages to process (line 7) or there are no more candidate times (line 9).

With reference to FIG. 2B the Scheduler 210 may be configured to implement the above methods, and may comprise a slot reservation map 212, an interference estimator 214, a latency estimator 216 and throughput constraints 218 which are used to schedule messages 201. The output 240 may be a slot schedule for the messages which is provided to the physical layer with the message bits, or the scheduler may send message bits according to the estimated schedule to the physical layer for transmission. The Scheduler 210 may be configured to receive external data 230 such as a medium coordination channel 232, link quality estimates 234 or updates 236, such as updates to data stored in the slot reservation map 212 obtained from a central or core network controller 400 (for example a central scheduler 440). Scheduling of transmissions may also be performed using methods such as those described in International Patent Application No. PCT/AU2017/000058 titled TERMINAL SCHEDULING METHOD IN SATELLITE COMMUNICATION SYSTEM and filed on 24 Feb. 2017, or methods such as those described in International Patent Application No. PCT/AU2018/000151 titled SYSTEM AND METHOD FOR PREDICTION OF COMMUNICATIONS LINK QUALITY and filed on 28 Aug. 2018 or some combination of these methods.

Figure 2C:
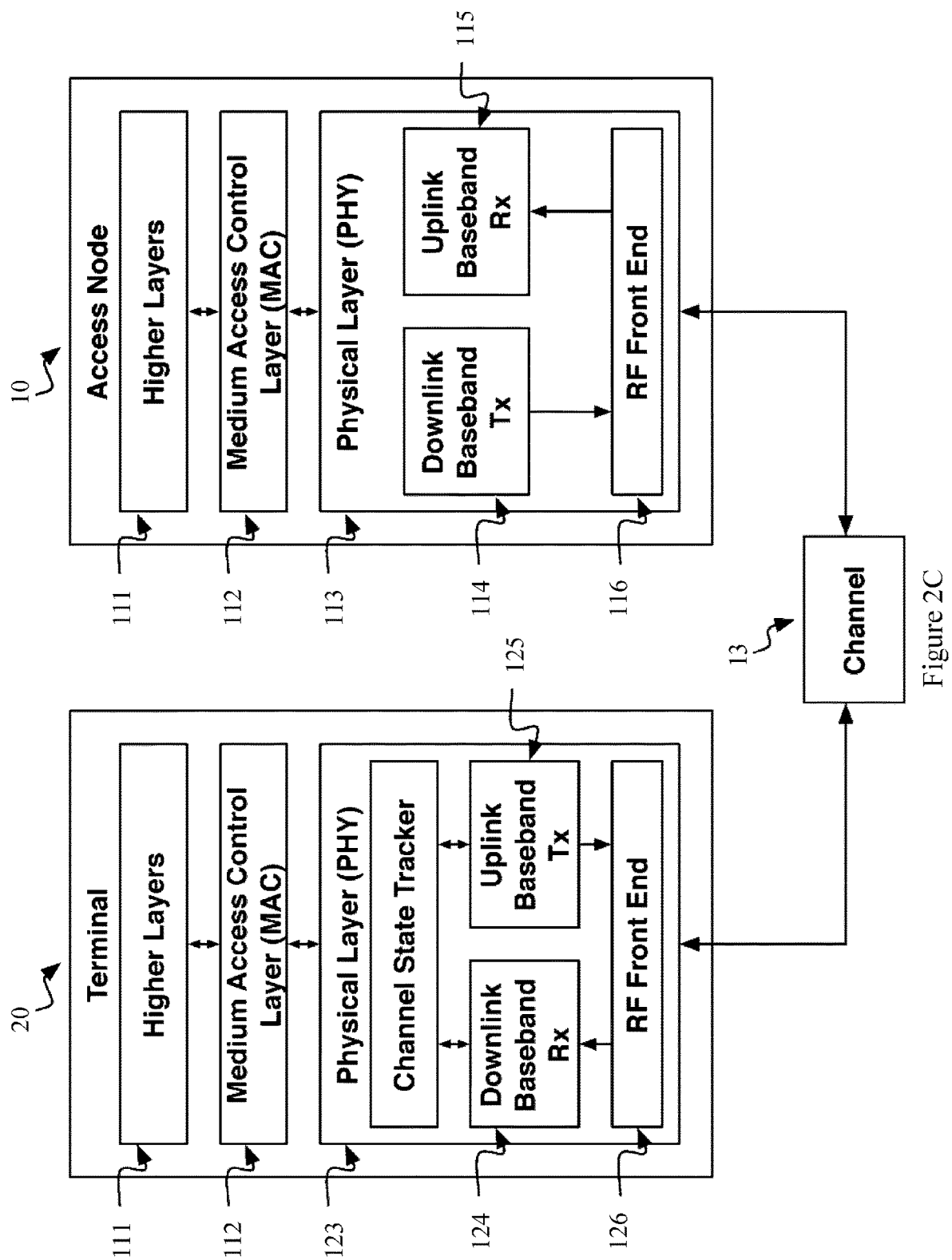
FIG. 2C is a block diagram of a terminal and an access node according to an embodiment.

FIG. 2C shows a block diagram of the access node 10 and a terminal 20 that communicate over a shared communications medium 13 according to an embodiment. The access nodes 10 and terminal nodes 20 shown in FIG. 2B each comprise a node specific physical layer (PHY) 116 126, medium access control (MAC) layer 112 and higher layer 111 respectively. Higher layers 111 may include a message networking layer and application layer which provides messages for transmission by the lower layers, and receives messages received (and processed) by the lower layers. The medium access control (MAC) layer determines how access to the radio channel is organized and controlled via the respective Physical Layer 113 123 and in some embodiments implements a scheduler 210 as described herein. However in other embodiments the scheduler 210 (or steps of the scheduling method) may be spread across multiple layers (e.g., PHY and MAC), all layers or distributed across the system. The MAC interfaces with the Physical Layer 113 123 which handles transmission and reception of signals. The MAC provides source bits for transmission and receives data bits for provision to Higher Layers (e.g., to the Message Networking Layer).

The Physical Layer 113 123 comprises an RF front end 116 126 and additional hardware and/or software components such as a baseband receiver and baseband transmitter. Received signals are converted to baseband by a RF front end, and delivered to a baseband receiver for processing, such as demodulation and decoding to extract message data. Similarly the baseband transmitter receives source bits and uses these to generate the baseband signal for transmission via the RF front end, such as applying a modulation and coding scheme, and the transmit subcarriers and power (as instructed by the MAC). For access node apparatus the baseband transmitter 114 is for downlink transmissions and the base band receiver 115 is for uplink received signals (e.g., transmissions from terminals). For terminal apparatus the baseband transmitter 125 is for uplink transmissions and the base band receiver 124 is for downlink received signals (e.g., transmissions from an access node). The Physical Layer may be a standalone module or board, or be integrated with other components within the apparatus. A software defined radio implementation may be used where a RF front end provides received signals to an analog to Digital (ADC) converter that provides spectrum samples to a signal processor (for further processing) and which receives analog signals for transmission from a Digital to Analog (DAC) converter.

The terminal baseband receiver 124 processes signals received from the access node and outputs decoded data. The receiver may also provide estimates for downlink channel effects, such as time offset, frequency offset (and its rate of change), a received signal strength indicator (e.g., complex channel gain), and signal-to-noise ratio (SNR). These estimates may be optionally time stamped and may be passed to a channel state tracker which tracks them over time and uses these parameter estimates along with any other known or estimated information about the access node (e.g., its motion relative to the terminal, or orbital parameters in the case of an access node in low Earth orbit), to predict uplink channel effects. The channel state tracker may pass these predictions to the MAC layer where they are used to assist in scheduling transmission. The predictions are also passed to the baseband transmitter where they may be used to pre-compensate for uplink channel effects. In some embodiments the terminal determines which slots to transmit on, and in other embodiments the terminal may transmit a request for channel access to the access node. The access node decodes the data received from the terminal, then allocates uplink slots to the terminal for future use and notifies the terminal of its allocation via a downlink message. Similar processing may occur at the access node where the baseband receiver 115 may process signals received from the terminals and output decoded data, along with estimates for uplink channel effects, such as time offset, frequency offset (and its rate of change), complex channel gain, and signal-to-noise ratio (SNR). In some cases the access node may capture spectrum samples and forward to a central processor in the core network 400 via a gateway node which estimates these quantities.

Figure 3:
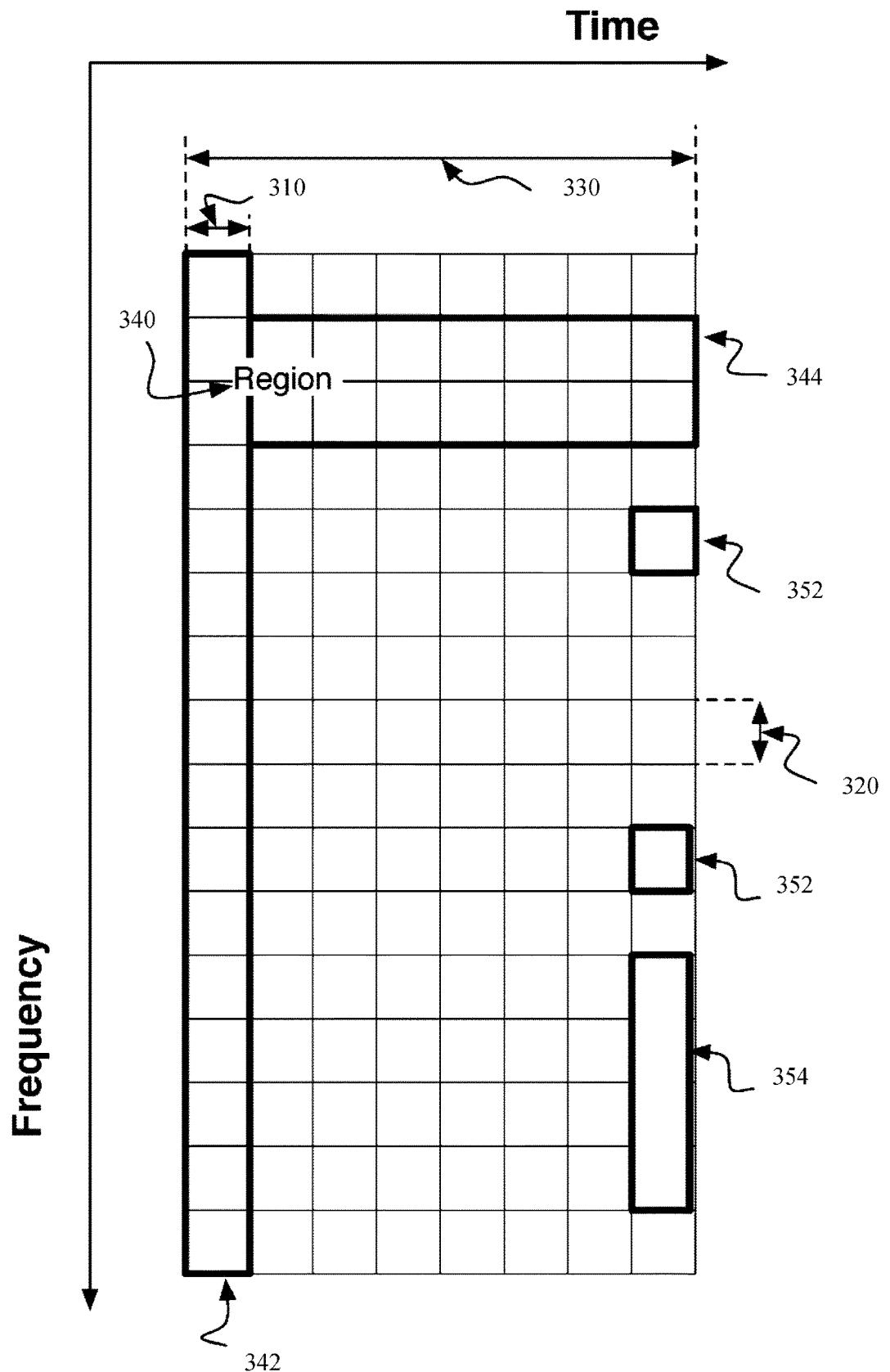
FIG. 3 is a schematic representation of a slot scheduler according to an embodiment.

FIG. 3 is a schematic representation of a slot schedule 240 according to an embodiment. In this embodiment slots are partitioned in time (x axis) and frequency (y axis). In this embodiment the time dimension of the uplink is divided into time slots 310 and the frequency dimension of the uplink is divided into subcarrier slots 320. In this embodiment a frame 330 consists of an integral number of time slot periods.

In this embodiment permanently reserved slots 340 are shown in the shaded region. In this embodiment this comprises a set of all subcarriers at a particular time 342 and a block 344 spanning multiple time and subcarriers. Additionally several individual transient slots 352 and a transient block of slots 354 are indicated which represent slots to be avoided in order to minimize interference on other systems. The remaining slots are then free for allocation by the system, and the slot map may further indicate which slot each message is to be transmitted in (not shown), for example in order to maximize system performance whilst minimizing interference.

Figure 4:
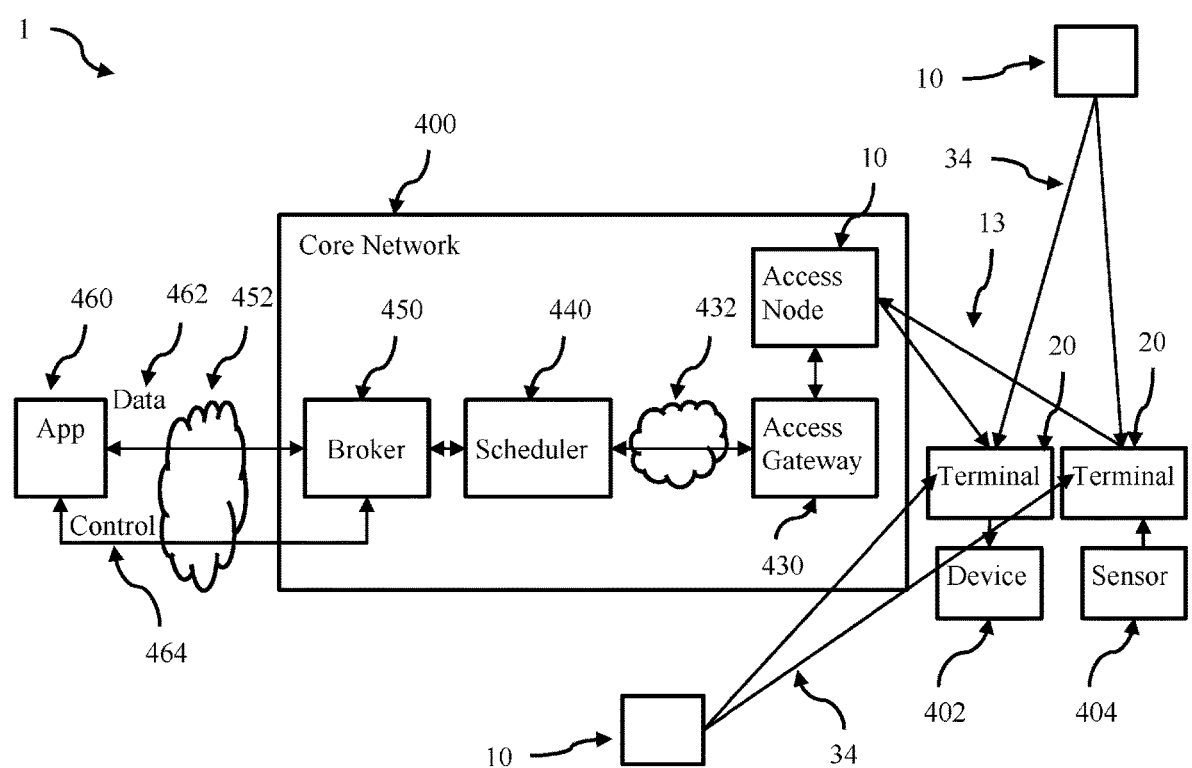
FIG. 4 is a schematic illustration of a satellite communications system 1 according to an embodiment.

FIG. 4 is a schematic illustration of a satellite communications system 1 according to an embodiment. The communication system 1 shown in FIG. 4 may be equivalently referred to as a communications network and comprises a plurality of satellite access nodes 10 and a plurality of terminals 20. The core network 400 comprises access nodes 410 (satellites and terrestrial), access gateways 430, a network scheduler apparatus 440, and an authentication broker 450. The broker 450 can exchange data 462 with applications 460 (via an App Gateway) and control information 464 directly with applications 460. The component of the core network 400 may be distributed and communicate over communications links. Some components may be cloud based. Terminals 20 or satellites 10 may provide information to a network scheduler apparatus 440 in the core network 400 for performing optimization calculations for scheduling transmissions and providing scheduling information for terminals and satellites. The network scheduler 440 may also collect and process information on other satellite communication systems and provide relevant data to local scheduling modules in the terminals 20 or satellites 10, for example to update the slot reservation map 212, or provide parameters for local interference calculations. The terminals 20 may monitor reference links such as the medium coordination channel 24 with additional transmitters 10 of other communication systems including satellite transmitters such as GNSS satellites, and terrestrial transmitters.

In one embodiment the system 1 uses a publisher subscriber model, and comprises the following system entities (also referred to as nodes or apparatus):

Terminals 20: A communication module within a terminal provides core network connectivity to access nodes. Terminals 20 may have both devices 402 and sensors 404 attached. These may be physically attached or integrated, or operatively connected to the terminal over a local wired or a local wireless link.

Devices 402: These entities receive data to which they are subscribed via the authentication broker.

Sensors 404: These entities publish data with no awareness of other network nodes. Sensors may also be able to receive ephemeral control data, publish ACK messages, etc.

Access Node 410: A plurality of access nodes provide wireless communications with a plurality of terminals. Most access nodes are satellite access nodes but the system may include terrestrial base stations and high altitude platforms. Access nodes provide access to the core network 400.

Access Gateway 430: These act as gateways between Access Nodes and the Authentication Broker. The gateway may be combined with the Access Node 410 (for example on board a satellite).

Authentication Broker 450: Broker between Publishers and Subscribers. Brokers authenticate that received messages are from registered terminals. The Authentication Broker may comprise an App Gateway which acts as a Data gateway with Applications 460 and may implement a number of interfaces. This may be a cloud based interface. Interfaces include a Message Queue Telemetry Transport (MQTT) interface, forwarding to a customer controlled Endpoint; or a Customer accessible Endpoint.

Application 460: Customer applications. These communicate with the App gateway over wired and wireless links, for example to a cloud based App Gateway.

Embodiments of the methods have been described in relation to terminal and access node communications. However the methods may also be used between access node and gateway (e.g., ground station) communications to schedule such transmissions whilst minimizing interference to other communication systems. Similarly if the terminals and/or gateway are moving, and a terminal becomes in range of a gateway, the terminal and gateway may also use the methods described herein to schedule transmissions whilst minimizing interference to other communication systems.

Methods that enable network entities such as terminals and access nodes to perform interference aware scheduling have been described. The methods described herein may be used in communication systems in which at least some of the access points are satellites (including LEO and Medium Earth Orbit (MEO) satellites) or high altitude platforms such as airborne access points (pseudo-satellites) or high altitude unmanned aerial vehicles (UAVs), such as solar and/or battery powered drones or airships capable of remaining in the air for extended periods (e.g., multiple days), or with fixed or mobile terrestrial access points. The system could also be used with completely terrestrial communication systems (i.e., purely terrestrial access points and/or terminals) located on land or sea, or communication systems featuring terrestrial access points and/or terminals and airborne access points and/or terminals where spectrum is shared, and there is potential interference, with satellite (or airborne/high altitude) communication systems.

The scheduler 440 may also be configured to perform scheduling of transmissions such as those described in International Patent Application No. PCT/AU2017/000058 filed on 24 Feb. 2017 and titled "TERMINAL SCHEDULING METHOD IN SATELLITE COMMUNICATION SYSTEM", or using probabilistic scheduling methods based on link quality estimates such as described in PCT/AU2018/000151 titled SYSTEM AND METHOD FOR PREDICTION OF COMMUNICATIONS LINK QUALITY and filed on 28 Aug. 2018.

In another embodiment medium utilization is improved further by allowing multiple users to coexist in the same spectrum using techniques described in International Patent Application No. PCT/AU2014/000826 titled A MULTIUSER COMMUNICATIONS SYSTEM and filed on 21 Aug. 2014. Careful management of inter-system interference can enable multiple systems to coexist, with further benefits to resource utilization and system performance. Multiuser receiver techniques can also exploit transmit power as a degree of freedom for medium sharing. For example, a strong signal and a weak signal may coexist with appropriate cancellation of the strong signal prior to decoding the weaker signal.

Various embodiments of an adaptive communication system have been described which perform interference aware scheduling to efficiently allow spectrum sharing by multiple separate communication systems using a shared communications medium. The scheduler may be implemented in terminals, access nodes (including satellite access nodes), gateways, or be distributed through a communication system. The scheduler 210 is configured to schedule transmissions by selecting slot transmission parameters in any transmission degree of freedom, (e.g., time, frequency, antenna polarization, spreading sequence, transmit power, etc.). In some embodiments one or more receivers in one or more external communication systems may be determined to be present during a transmission time period, for example by direct detection, estimation based on ephemeris or other data, or acquisition of a transmission or beacon. The scheduler is configured to schedule transmission of the one or more messages in one or more slots in a plurality of slots by selecting one or more slot transmission parameters for transmitting the one or more messages during the transmission time period. The scheduling comprises determining, using the one or more interference parameters, the likelihood that the selected one or more slot transmission parameters are likely to cause interference to the one or more external communication systems, and if interference is determined to be likely, then adjusting one or more of the slot transmission parameters to determine if the change will result in an acceptable reduction of the interference. In some embodiments a slot reservation map may be utilized to determine if transmission in a slot is likely to cause interference to the one or more external communication systems. In some embodiments a probabilistic approach may be used in which the probability of successful reception, or alternatively the probability of error (i.e., not received) is estimated. In some embodiments the scheduler is configured to minimize time varying measures of communication quality (e.g., probability of error and latency), whilst simultaneously minimizing time varying measures of interference to external communication systems. These methods exploit the time varying nature of the interference. Methods of choosing transmit times for a list of M messages have been described that aim to constrain the probability of error $P_m$ for each message in m∈M and the interference H whilst minimising the latency, that is, minimizing the time required for each message to be received. Alternatively the scheduler may choose transmit times for a list of M messages that aim to constrain the probability of error $P_m$ for each message in m∈M and the latency L whilst minimizing interference, or choose transmit times for a list of M messages that aim to constrain the probability of error $P_m$ for each message in m∈M, latency L, and the interference H. The latency L may be measured as the expected latency (12) or latency may be measured as a percentile $P_m(b)$ as in (10).

Those of skill in the art would understand that information and signals may be represented using any of a variety of technologies and techniques. For example, data, instructions, commands, information, signals, bits, symbols, and chips may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software or instructions, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or other electronic units designed to perform the functions described herein, or a combination thereof.

In some embodiments the processor module comprises one or more Central Processing Units (CPUs) configured to perform some of the steps of the methods. Similarly a computing apparatus may be used to generate the orbital model to be supplied to the terminal apparatus, and the computing apparatus may comprise one or more CPUs. A CPU may comprise an Input/Output Interface, an Arithmetic and Logic Unit (ALU) and a Control Unit and Program Counter element which is in communication with input and output devices through the Input/Output Interface. The Input/Output Interface may comprise a network interface and/or communications module for communicating with an equivalent communications module in another device using a predefined communications protocol (e.g., Bluetooth, Zigbee, IEEE 802.15, IEEE 802.11, TCP/IP, UDP, etc.). The computing or terminal apparatus may comprise a single CPU (core) or multiple CPU's (multiple core), or multiple processors. The computing or terminal apparatus may use a parallel processor, a vector processor, or be a distributed computing device. Memory is operatively coupled to the processor(s) and may comprise RAM and ROM components, and may be provided within or external to the device or processor module. The memory may be used to store an operating system and additional software modules or instructions. The processor(s) may be configured to load and execute the software modules or instructions stored in the memory.

Software modules, also known as computer programs, computer codes, or instructions, may contain a number of source code or object code segments or instructions, and may reside in any computer readable medium such as a RAM memory, flash memory, ROM memory, EPROM memory, registers, hard disk, a removable disk, a CD-ROM, a DVD-ROM, a Blu-ray disc, or any other form of computer readable medium. In some aspects the computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media. In another aspect, the computer readable medium may be integral to the processor. The processor and the computer readable medium may reside in an ASIC or related device. The software codes may be stored in a memory unit and the processor may be configured to execute them. The memory unit may be implemented within the processor or external to the processor, in which case it can be communicatively coupled to the processor via various means as is known in the art.

Further, it should be appreciated that modules and/or other appropriate means for performing the methods and techniques described herein can be downloaded and/or otherwise obtained by a computing device. For example, such a device can be coupled to a server to facilitate the transfer of means for performing the methods described herein. Alternatively, various methods described herein can be provided via storage means (e.g., RAM, ROM, a physical storage medium such as a Flash Drive, optical disc (DVD, CD) or, etc.), such that a computing device can obtain the various methods upon coupling or providing the storage means to the device. Moreover, any other suitable technique for providing the methods and techniques described herein to a device can be utilized.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, the terms "estimating" or "determining" encompasses a wide variety of actions. For example, "estimating" or "determining" may include calculating, computing, processing, deriving, investigating, looking up (e.g., looking up in a table, a database or another data structure), ascertaining and the like. Also, "estimating" or "determining" may include receiving (e.g., receiving information), accessing (e.g., accessing data in a memory) and the like. Also, "determining" may include resolving, selecting, choosing, establishing and the like.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the disclosure is not restricted in its use to the particular application or applications described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope as set forth and defined by the following claims.

The invention claimed is:

1. A method for scheduling transmissions in a wireless communication system comprising one or more access nodes, and a plurality of terminals, wherein the one or more access nodes comprises at least one access node with a moving field of view relative to the plurality of terminals, the method comprising:

receiving one or more messages for transmission;
determining one or more interference parameters of one or more external communication systems for a transmission location and during a transmission time period;
scheduling transmission of the one or more messages in one or more slots in a plurality of slots by selecting one or more slot transmission parameters for transmitting the one or more messages during the transmission time period and determining, using the one or more interference parameters, the likelihood that the selected one or more slot transmission parameters are likely to cause interference to the one or more external communication systems, and if interference is determined to be likely, then adjusting one or more of the slot transmission parameters to determine if a change will result in an acceptable reduction of the interference,
wherein determining the one or more interference parameters comprises storing a slot reservation map that stores one or more reserved slots for the one or more external communication systems and one or more of the one or more reserved slots are reserved on a per-satellite level, and determining using the one or more interference parameters, the likelihood that the selected one or more slot transmission parameters are likely to cause interference comprises detecting or estimating if a satellite associated with a reserved slot is detected or estimated to be present during the transmission time period and preventing selection of the reserved slot if the satellite is detected or estimated to be present.

2. The method as claimed in claim 1 wherein the one or more slot transmission parameters comprises one or more of a time, a frequency, an antenna polarization, a spreading sequence, a transmit power, or a spatial division.

3. The method as claimed in claim 1, further comprising obtaining an estimate of the position of a transmitter during the transmission time period, and determining, using the one or more interference parameters, the likelihood that the selected one or more slot transmission parameters are likely to cause interference uses the estimate of the position of the transmitter to determine if transmission in a slot is likely to cause interference.

4. A method for scheduling transmissions in a wireless communication system comprising one or more access nodes, and a plurality of terminals, wherein the one or more access nodes comprises at least one access node with a moving field of view relative to the plurality of terminals, the method comprising:
receiving one or more messages for transmission;
determining one or more interference parameters of one or more external communication systems for a transmission location and during a transmission time period;
scheduling transmission of the one or more messages in one or more slots in a plurality of slots by selecting one or more slot transmission parameters for transmitting the one or more messages during the transmission time period and determining, using the one or more interference parameters, the likelihood that the selected one or more slot transmission parameters are likely to cause interference to the one or more external communication systems, and if interference is determined to be likely, then adjusting one or more of the slot transmission parameters to determine if a change will result in an acceptable reduction of the interference,
wherein determining the one or more interference parameters comprises storing a slot reservation map that stores one or more reserved slots for the one or more external communication systems and one or more of the one or more reserved slots are reserved on a per-geographic region, and determining using the one or more interference parameters, the likelihood that the selected one or more slot transmission parameters are likely to cause interference comprises estimating the location of the transmitter during the transmission period and determining if the transmitter is located within a geographic region associated with one or more reserved slots and preventing allocation of the respective reserved one or more slots.

5. The method as claimed in claim 4 wherein the one or more slot transmission parameters comprises one or more of a time, a frequency, an antenna polarisation, a spreading sequence, a transmit power, or a spatial division.

6. The method as claimed in claim 4, further comprising obtaining an estimate of the position of a transmitter during the transmission time period, and determining, using the one or more interference parameters, the likelihood that the selected one or more slot transmission parameters are likely to cause interference uses the estimate of the position of the transmitter to determine if transmission in a slot is likely to cause interference.

7. A method for scheduling transmissions in a wireless communication system comprising one or more access nodes, and a plurality of terminals, wherein the one or more access nodes comprises at least one access node with a moving field of view relative to the plurality of terminals, the method comprising:
receiving one or more messages for transmission;
determining one or more interference parameters of one or more external communication systems for a transmission location and during a transmission time period;
scheduling transmission of the one or more messages in one or more slots in a plurality of slots by selecting one or more slot transmission parameters for transmitting the one or more messages during the transmission time period and determining, using the one or more interference parameters, the likelihood that the selected one or more slot transmission parameters are likely to cause interference to the one or more external communication systems, and if interference is determined to be likely, then adjusting one or more of the slot transmission parameters to determine if a change will result in an acceptable reduction of the interference,
wherein determining one or more interference parameters comprises determining an elevation threshold of one or more receivers in the one or more external communication systems and determining using the one or more interference parameters, the likelihood that the selected one or more slot transmission parameters are likely to cause interference comprises estimating an elevation angle of a receiver in one or more external communication systems during the transmission time period and determining if the elevation angle exceeds the elevation threshold for the receiver.

8. The method as claimed in claim 7 wherein the one or more slot transmission parameters comprises one or more of a time, a frequency, an antenna polarisation, a spreading sequence, a transmit power, or a spatial division.

9. The method as claimed in claim 7, further comprising obtaining an estimate of the position of a transmitter during the transmission time period, and determining, using the one or more interference parameters, the likelihood that the selected one or more slot transmission parameters are likely to cause interference uses the estimate of the position of the transmitter to determine if transmission in a slot is likely to cause interference.

10. A method for scheduling transmissions in a wireless communication system comprising one or more access nodes, and a plurality of terminals, wherein the one or more access nodes comprises at least one access node with a moving field of view relative to the plurality of terminals, the method comprising:
receiving one or more messages for transmission;
determining one or more interference parameters of one or more external communication systems for a transmission location and during a transmission time period;
scheduling transmission of the one or more messages in one or more slots in a plurality of slots by selecting one or more slot transmission parameters for transmitting the one or more messages during the transmission time period and determining, using the one or more interference parameters, the likelihood that the selected one or more slot transmission parameters are likely to cause interference to the one or more external communication systems, and if interference is determined to be likely, then adjusting one or more of the slot transmission parameters to determine if a change will result in an acceptable reduction of the interference, The method as claimed in claim 1, wherein determining one or more interference parameters of one or more external communication systems comprises receiving one or more transmissions from a transmitter in the one or more external communication systems on a medium coordination channel which provides information to assist in sharing the medium comprises one or more of an elevation angle, a signal to noise ratio, an interference level, a power level, a link quality estimate, a channel state estimate, or a tolerable interference level.

11. The method as claimed in claim 10, wherein determining the one or more interference parameters further comprises storing a slot reservation map that stores one or more reserved slots for the one or more external communication systems and the information is used to update the slot reservation map.

12. The method as claimed in claim 10 wherein the one or more slot transmission parameters comprises one or more of a time, a frequency, an antenna polarisation, a spreading sequence, a transmit power, or a spatial division.

13. The method as claimed in claim 10, further comprising obtaining an estimate of the position of a transmitter during the transmission time period, and determining, using the one or more interference parameters, the likelihood that the selected one or more slot transmission parameters are likely to cause interference uses the estimate of the position of the transmitter to determine if transmission in a slot is likely to cause interference.

14. A method for scheduling transmissions in a wireless communication system comprising one or more access nodes, and a plurality of terminals, wherein the one or more access nodes comprises at least one access node with a moving field of view relative to the plurality of terminals, the method comprising:
receiving one or more messages for transmission;
determining one or more interference parameters of one or more external communication systems for a transmission location and during a transmission time period;
scheduling transmission of the one or more messages in one or more slots in a plurality of slots by selecting one or more slot transmission parameters for transmitting the one or more messages during the transmission time period and determining, using the one or more interference parameters, the likelihood that the selected one or more slot transmission parameters are likely to cause interference to the one or more external communication systems, and if interference is determined to be likely, then adjusting one or more of the slot transmission parameters to determine if a change will result in an acceptable reduction of the interference,
wherein determining one or more interference parameters of one or more external communication systems for a transmission location during the transmission time period comprises:
obtaining ephemeris data on one or more satellite receivers in the one or more external communication systems; and
obtaining an estimate of a position of a transmitter during the transmission time period,
wherein determining, using the one or more interference parameters, the likelihood that the selected one or more slot transmission parameters are likely to cause interference uses the terminal position, ephemeris data and transmission time period to estimate the likelihood of interference with the one or more receivers in the one or more external communication systems.

15. The method as claimed in claim 14 wherein the one or more slot transmission parameters comprises one or more of a time, a frequency, an antenna polarisation, a spreading sequence, a transmit power, or a spatial division.

16. A method for scheduling transmissions in a wireless communication system comprising one or more access nodes, and a plurality of terminals, wherein the one or more access nodes comprises at least one access node with a moving field of view relative to the plurality of terminals, the method comprising:
receiving one or more messages for transmission;
determining one or more interference parameters of one or more external communication systems for a transmission location and during a transmission time period;
scheduling transmission of the one or more messages in one or more slots in a plurality of slots by selecting one or more slot transmission parameters for transmitting the one or more messages during the transmission time period and determining, using the one or more interference parameters, the likelihood that the selected one or more slot transmission parameters are likely to cause interference to the one or more external communication systems, and if interference is determined to be likely, then adjusting one or more of the slot transmission parameters to determine if a change will result in an acceptable reduction of the interference,
wherein determining, using the one or more interference parameters, the likelihood that the selected one or more slot transmission parameters are likely to cause interference comprises estimating a time varying estimate of inference over the transmission time period and selecting one or more slot transmission parameters and adjusting one or more of the slot transmission parameters is performed by using an optimization method to determine the one or more slot transmission parameters that minimize or constrain a total interference.

17. The method as claimed in claim 16, wherein determining, using the one or more interference parameters, the likelihood that the selected one or more slot transmission parameters are likely to cause interference further comprises estimating a probability of error that a transmission is not received at a target receiver and a latency and the optimization method determines the one or more slot transmission parameters by minimizing one of the time varying estimate of inference over the transmission time period, the probability of error that a transmission is not received at a target receiver and the latency subject to one or more constraints on the time varying estimate of inference over the transmission time period, the probability of error that a transmission is not received at a target receiver and the latency, and the optimization is performed jointly over all slot transmission parameters.

18. The method as claimed in claim 17, wherein the optimization is performed subject to a throughput constraint.

19. The method as claimed in claim 18, wherein the throughput constraint comprises restricting transmission times during the transmission time period to a discrete grid of width W.

20. The method as claimed in claim 17, wherein the latency is an overall expected latency.

21. The method as claimed in claim 17, wherein the latency constraint is based on a percentile probability.

22. The method as claimed in claim 16, wherein determining, using the one or more interference parameters, the likelihood that the selected one or more slot transmission parameters are likely to cause interference further comprises estimating a probability of error that a transmission is not received at a target receiver and a latency and the optimization method uses a greedy scheduling algorithm that selects a transmission time sequentially such that transmissions are scheduled at times that decreases the latency and probability of error whilst minimally increasing the interference.

23. The method as claimed in claim 22 wherein the greedy scheduling algorithm minimizes a mean latency and a total external interference.

24. The method as claimed in claim 16 wherein the one or more slot transmission parameters comprises one or more of a time, a frequency, an antenna polarisation, a spreading sequence, a transmit power, or a spatial division.

25. The method as claimed in claim 16, further comprising obtaining an estimate of the position of a transmitter during the transmission time period, and determining, using the one or more interference parameters, the likelihood that the selected one or more slot transmission parameters are likely to cause interference uses the estimate of the position of the transmitter to determine if transmission in a slot is likely to cause interference.

26. A terminal apparatus in a wireless communication system comprising one or more access nodes wherein the one or more access nodes comprises at least one access node with a moving field of view relative to the terminal apparatus, the terminal apparatus comprising an uplink baseband transmitter and an RF front end, and a scheduler configured to:
receive one or more messages for transmission by the terminal;
determine one or more interference parameters of one or more external communication systems for a transmission location and during a transmission time period;
schedule transmission of the one or more messages in one or more slots in a plurality of slots by selecting one or more slot transmission parameters for transmitting the one or more messages during the transmission time period and determining, using the one or more interference parameters, the likelihood that the selected one or more slot transmission parameters are likely to cause interference to the one or more external communication systems, and if interference is determined to be likely, then adjusting one or more of the slot transmission parameters to determine if a change will result in an acceptable reduction of the interference, wherein determining the one or more interference parameters comprises storing a slot reservation map that stores one or more reserved slots for the one or more external communication systems and one or more of the one or more reserved slots are reserved on a per-satellite level, and determining using the one or more interference parameters, the likelihood that the selected one or more slot transmission parameters are likely to cause interference comprises detecting or estimating if a satellite associated with a reserved slot is detected or estimated to be present during the transmission time period and preventing selection of the reserved slot if the satellite is detected or estimated to be present, or wherein determining the one or more interference parameters comprises storing a slot reservation map that stores one or more reserved slots for the one or more external communication systems and one or more of the one or more reserved slots are reserved on a per-geographic region, and determining using the one or more interference parameters, the likelihood that the selected one or more slot transmission parameters are likely to cause interference comprises estimating the location of the transmitter during the transmission period and determining if the transmitter is located within a geographic region associated with one or more reserved slots and preventing allocation of the respective reserved one or more slots, or wherein determining the one or more interference parameters comprises determining an elevation threshold of one or more receivers in the one or more external communication systems and determining using the one or more interference parameters, the likelihood that the selected one or more slot transmission parameters are likely to cause interference comprises estimating an elevation angle of a receiver in one or more external communication systems during the transmission time period and determining if the elevation angle exceeds the elevation threshold for the receiver, or wherein determining the one or more interference parameters comprises receiving one or more transmissions from a transmitter in the one or more external communication systems on a medium coordination channel which provides information to assist in sharing the medium comprises one or more of an elevation angle, a signal to noise ratio, an interference level, a power level, a link quality estimate, a channel state estimate, or a tolerable interference level, or wherein determining one or more interference parameters of one or more external communication systems for a transmission location during the transmission time period comprises obtaining ephemeris data on one or more satellite receivers in the one or more external communication systems, and obtaining an estimate of a position of a transmitter during the transmission time period, and wherein determining, using the one or more interference parameters, the likelihood that the selected one or more slot transmission parameters are likely to cause interference uses the terminal position, ephemeris data and transmission time period to estimate the likelihood of interference with the one or more receivers in the one or more external communication systems.

27. An access node apparatus in a wireless communication system comprising a plurality of terminals, wherein the access node is moving such that a field of view of the access node is moving relative to the plurality of terminals, the access node apparatus comprising a downlink baseband transmitter and an RF front end, and a scheduler configured to:
- receive one or more messages for transmission by the access node apparatus;
- determine one or more interference parameters of one or more external communication systems for a transmission location and during a transmission time period;
- schedule transmission of the one or more messages in one or more slots in a plurality of slots by selecting one or more slot transmission parameters for transmitting the one or more messages during the transmission time period and determining, using the one or more interference parameters, the likelihood that the selected one or more slot transmission parameters are likely to cause interference to the one or more external communication systems, and if interference is determined to be likely, then adjusting one or more of the slot transmission parameters to determine if a change will result in an acceptable reduction of the interference,
- wherein determining the one or more interference parameters comprises storing a slot reservation map that stores one or more reserved slots for the one or more external communication systems and one or more of the one or more reserved slots are reserved on a per-satellite level, and determining using the one or more interference parameters, the likelihood that the selected one or more slot transmission parameters are likely to cause interference comprises detecting or estimating if a satellite associated with a reserved slot is detected or estimated to be present during the transmission time period and preventing selection of the reserved slot if the satellite is detected or estimated to be present, or
- wherein determining the one or more interference parameters comprises storing a slot reservation map that stores one or more reserved slots for the one or more external communication systems and one or more of the one or more reserved slots are reserved on a per-geographic region, and determining using the one or more interference parameters, the likelihood that the selected one or more slot transmission parameters are likely to cause interference comprises estimating the location of the transmitter during the transmission period and determining if the transmitter is located within a geographic region associated with one or more reserved slots and preventing allocation of the respective reserved one or more slots, or
- wherein determining the one or more interference parameters comprises determining an elevation threshold of one or more receivers in the one or more external communication systems and determining using the one or more interference parameters, the likelihood that the selected one or more slot transmission parameters are likely to cause interference comprises estimating an elevation angle of a receiver in one or more external communication systems during the transmission time period and determining if the elevation angle exceeds the elevation threshold for the receiver, or
- wherein determining the one or more interference parameters comprises receiving one or more transmissions from a transmitter in the one or more external communication systems on a medium coordination channel which provides information to assist in sharing the medium comprises one or more of an elevation angle, a signal to noise ratio, an interference level, a power level, a link quality estimate, a channel state estimate, or a tolerable interference level, or
- wherein determining one or more interference parameters of one or more external communication systems for a transmission location during the transmission time period comprises obtaining ephemeris data on one or more satellite receivers in the one or more external communication systems, and obtaining an estimate of a position of a transmitter during the transmission time period, and wherein determining, using the one or more interference parameters, the likelihood that the selected one or more slot transmission parameters are likely to cause interference uses the terminal position, ephemeris data and transmission time period to estimate the likelihood of interference with the one or more receivers in the one or more external communication systems.

28. A gateway apparatus in a wireless communication system comprising one or more access nodes, and a plurality of terminals, wherein the one or more access nodes comprises at least one access node with a moving field of view relative to the gateway apparatus, the gateway apparatus comprising an uplink baseband transmitter and an RF front end, and a scheduler configured to:
- receive one or more messages for transmission by the gateway apparatus;
- determine one or more interference parameters of one or more external communication systems for a transmission location and during a transmission time period;
- schedule transmission of the one or more messages in one or more slots in a plurality of slots by selecting one or more slot transmission parameters for transmitting the one or more messages during the transmission time period and determining, using the one or more interference parameters, the likelihood that the selected one or more slot transmission parameters are likely to cause interference to the one or more external communication systems, and if interference is determined to be likely, then adjusting one or more of the slot transmission parameters to determine if a change will result in an acceptable reduction of the interference,
- wherein determining the one or more interference parameters comprises storing a slot reservation map that stores one or more reserved slots for the one or more external communication systems and one or more of the one or more reserved slots are reserved on a per-satellite level, and determining using the one or more interference parameters, the likelihood that the selected one or more slot transmission parameters are likely to cause interference comprises detecting or estimating if a satellite associated with a reserved slot is detected or estimated to be present during the transmission time period and preventing selection of the reserved slot if the satellite is detected or estimated to be present, or
- wherein determining the one or more interference parameters comprises storing a slot reservation map that stores one or more reserved slots for the one or more external communication systems and one or more of the one or more reserved slots are reserved on a per-geographic region, and determining using the one or more interference parameters, the likelihood that the selected one or more slot transmission parameters are likely to cause interference comprises estimating the location of the transmitter during the transmission period and determining if the transmitter is located within a geographic region associated with one or more reserved slots and preventing allocation of the respective reserved one or more slots, or wherein determining the one or more interference parameters comprises determining an elevation threshold of one or more receivers in the one or more external communication systems and determining using the one or more interference parameters, the likelihood that the selected one or more slot transmission parameters are likely to cause interference comprises estimating an elevation angle of a receiver in one or more external communication systems during the transmission time period and determining if the elevation angle exceeds the elevation threshold for the receiver, or wherein determining the one or more interference parameters comprises receiving one or more transmissions from a transmitter in the one or more external communication systems on a medium coordination channel which provides information to assist in sharing the medium comprises one or more of an elevation angle, a signal to noise ratio, an interference level, a power level, a link quality estimate, a channel state estimate, or a tolerable interference level, or wherein determining one or more interference parameters of one or more external communication systems for a transmission location during the transmission time period comprises obtaining ephemeris data on one or more satellite receivers in the one or more external communication systems, and obtaining an estimate of a position of a transmitter during the transmission time period, and wherein determining, using the one or more interference parameters, the likelihood that the selected one or more slot transmission parameters are likely to cause interference uses the terminal position, ephemeris data and transmission time period to estimate the likelihood of interference with the one or more receivers in the one or more external communication systems.

29. A communication system comprising one or more terminal apparatus, one or more satellite access nodes, and a core network component comprising one or more gateways wherein the one or more access nodes comprises at least one access node with a moving field of view relative to the plurality of terminals, wherein the system further comprises a scheduler which is distributed across the system and is configured to:

receive one or more messages for transmission by one of the one or more terminals, one or more satellite access nodes, or one or more gateways;

determine one or more interference parameters of one or more external communication systems for a transmission location and during a transmission time period;

schedule transmission of the one or more messages in one or more slots in a plurality of slots by selecting one or more slot transmission parameters for transmitting the one or more messages during the transmission time period and determining, using the one or more interference parameters, the likelihood that the selected one or more slot transmission parameters are likely to cause interference to the one or more external communication systems, and if interference is determined to be likely, then adjusting one or more of the slot transmission parameters to determine if a change will result in an acceptable reduction of the interference, wherein determining the one or more interference parameters comprises storing a slot reservation map that stores one or more reserved slots for the one or more external communication systems and one or more of the one or more reserved slots are reserved on a per-satellite level, and determining using the one or more interference parameters, the likelihood that the selected one or more slot transmission parameters are likely to cause interference comprises detecting or estimating if a satellite associated with a reserved slot is detected or estimated to be present during the transmission time period and preventing selection of the reserved slot if the satellite is detected or estimated to be present, or wherein determining the one or more interference parameters comprises storing a slot reservation map that stores one or more reserved slots for the one or more external communication systems and one or more of the one or more reserved slots are reserved on a per-geographic region, and determining using the one or more interference parameters, the likelihood that the selected one or more slot transmission parameters are likely to cause interference comprises estimating the location of the transmitter during the transmission period and determining if the transmitter is located within a geographic region associated with one or more reserved slots and preventing allocation of the respective reserved one or more slots, or wherein determining the one or more interference parameters comprises determining an elevation threshold of one or more receivers in the one or more external communication systems and determining using the one or more interference parameters, the likelihood that the selected one or more slot transmission parameters are likely to cause interference comprises estimating an elevation angle of a receiver in one or more external communication systems during the transmission time period and determining if the elevation angle exceeds the elevation threshold for the receiver, or wherein determining the one or more interference parameters comprises receiving one or more transmissions from a transmitter in the one or more external communication systems on a medium coordination channel which provides information to assist in sharing the medium comprises one or more of an elevation angle, a signal to noise ratio, an interference level, a power level, a link quality estimate, a channel state estimate, or a tolerable interference level, or wherein determining one or more interference parameters of one or more external communication systems for a transmission location during the transmission time period comprises obtaining ephemeris data on one or more satellite receivers in the one or more external communication systems, and obtaining an estimate of a position of a transmitter during the transmission time period, and wherein determining, using the one or more interference parameters, the likelihood that the selected one or more slot transmission parameters are likely to cause interference uses the terminal position, ephemeris data and transmission time period to estimate the likelihood of interference with the one or more receivers in the one or more external communication systems.

30. A terminal apparatus in a wireless communication system comprising one or more access nodes wherein the one or more access nodes comprises at least one access node with a moving field of view relative to the terminal apparatus, the terminal apparatus comprising an uplink baseband transmitter and an RF front end, and a scheduler configured to:

receive one or more messages for transmission by the terminal;

determine one or more interference parameters of one or more external communication systems for a transmission location and during a transmission time period;

schedule transmission of the one or more messages in one or more slots in a plurality of slots by selecting one or more slot transmission parameters for transmitting the one or more messages during the transmission time period and determining, using the one or more interference parameters, the likelihood that the selected one or more slot transmission parameters are likely to cause interference to the one or more external communication systems, and if interference is determined to be likely, then adjusting one or more of the slot transmission parameters to determine if a change will result in an acceptable reduction of the interference, wherein determining, using the one or more interference parameters, the likelihood that the selected one or more slot transmission parameters are likely to cause interference comprises estimating a time varying estimate of inference over the transmission time period and selecting one or more slot transmission parameters and adjusting one or more of the slot transmission parameters is performed by using an optimization method to determine the one or more slot transmission parameters that minimise or constrain a total interference.

31. The terminal apparatus as claimed in claim 30, wherein determining, using the one or more interference parameters, the likelihood that the selected one or more slot transmission parameters are likely to cause interference further comprises estimating a probability of error that a transmission is not received at a target receiver and a latency and the optimization method determines the one or more slot transmission parameters by minimising one of the time varying estimate of inference over the transmission time period, the probability of error that a transmission is not received at a target receiver and the latency subject to one or more constraints on the time varying estimate of inference over the transmission time period, the probability of error that a transmission is not received at a target receiver and the latency, and the optimization is performed jointly over all slot transmission parameters.

32. The terminal apparatus as claimed in claim 30, wherein determining, using the one or more interference parameters, the likelihood that the selected one or more slot transmission parameters are likely to cause interference further comprises estimating a probability of error that a transmission is not received at a target receiver and a latency and the optimization method uses a greedy scheduling algorithm that selects a transmission time sequentially such that transmissions are scheduled at times that decreases the latency and probability of error whilst minimally increasing the interference.

33. An access node apparatus in a wireless communication system comprising a plurality of terminals, wherein the access node is moving such that a field of view of the access node is moving relative to the plurality of terminals, the access node apparatus comprising a downlink baseband transmitter and an RF front end, and a scheduler configured to:

receive one or more messages for transmission by the access node apparatus;

determine one or more interference parameters of one or more external communication systems for a transmission location and during a transmission time period;

schedule transmission of the one or more messages in one or more slots in a plurality of slots by selecting one or more slot transmission parameters for transmitting the one or more messages during the transmission time period and determining, using the one or more interference parameters, the likelihood that the selected one or more slot transmission parameters are likely to cause interference to the one or more external communication systems, and if interference is determined to be likely, then adjusting one or more of the slot transmission parameters to determine if a change will result in an acceptable reduction of the interference, wherein determining, using the one or more interference parameters, the likelihood that the selected one or more slot transmission parameters are likely to cause interference comprises estimating a time varying estimate of inference over the transmission time period and selecting one or more slot transmission parameters and adjusting one or more of the slot transmission parameters is performed by using an optimization method to determine the one or more slot transmission parameters that minimise or constrain a total interference.

34. The access node as claimed in claim 33, wherein determining, using the one or more interference parameters, the likelihood that the selected one or more slot transmission parameters are likely to cause interference further comprises estimating a probability of error that a transmission is not received at a target receiver and a latency and the optimization method determines the one or more slot transmission parameters by minimising one of the time varying estimate of inference over the transmission time period, the probability of error that a transmission is not received at a target receiver and the latency subject to one or more constraints on the time varying estimate of inference over the transmission time period, the probability of error that a transmission is not received at a target receiver and the latency, and the optimization is performed jointly over all slot transmission parameters.

35. The access node as claimed in claim 33, wherein determining, using the one or more interference parameters, the likelihood that the selected one or more slot transmission parameters are likely to cause interference further comprises estimating a probability of error that a transmission is not received at a target receiver and a latency and the optimization method uses a greedy scheduling algorithm that selects a transmission time sequentially such that transmissions are scheduled at times that decreases the latency and probability of error whilst minimally increasing the interference.

36. A gateway apparatus in a wireless communication system comprising one or more access nodes, and a plurality of terminals, wherein the one or more access nodes comprises at least one access node with a moving field of view relative to the gateway apparatus, the gateway apparatus comprising an uplink baseband transmitter and an RF front end, and a scheduler configured to:

receive one or more messages for transmission by the gateway apparatus;

determine one or more interference parameters of one or more external communication systems for a transmission location and during a transmission time period;

schedule transmission of the one or more messages in one or more slots in a plurality of slots by selecting one or more slot transmission parameters for transmitting the one or more messages during the transmission time period and determining, using the one or more interference parameters, the likelihood that the selected one or more slot transmission parameters are likely to cause interference to the one or more external communication systems, and if interference is determined to be likely, then adjusting one or more of the slot transmission parameters to determine if a change will result in an acceptable reduction of the interference, wherein determining, using the one or more interference parameters, the likelihood that the selected one or more slot transmission parameters are likely to cause interference comprises estimating a time varying estimate of inference over the transmission time period and selecting one or more slot transmission parameters and adjusting one or more of the slot transmission parameters is performed by using an optimization method to determine the one or more slot transmission parameters that minimise or constrain a total interference.

37. The gateway apparatus as claimed in claim 36, wherein determining, using the one or more interference parameters, the likelihood that the selected one or more slot transmission parameters are likely to cause interference further comprises estimating a probability of error that a transmission is not received at a target receiver and a latency and the optimization method determines the one or more slot transmission parameters by minimising one of the time varying estimate of inference over the transmission time period, the probability of error that a transmission is not received at a target receiver and the latency subject to one or more constraints on the time varying estimate of inference over the transmission time period, the probability of error that a transmission is not received at a target receiver and the latency, and the optimization is performed jointly over all slot transmission parameters.

38. The gateway apparatus as claimed in claim 36, wherein determining, using the one or more interference parameters, the likelihood that the selected one or more slot transmission parameters are likely to cause interference further comprises estimating a probability of error that a transmission is not received at a target receiver and a latency and the optimization method uses a greedy scheduling algorithm that selects a transmission time sequentially such that transmissions are scheduled at times that decreases the latency and probability of error whilst minimally increasing the interference.

39. A communication system comprising one or more terminal apparatus, one or more satellite access nodes, and a core network component comprising one or more gateways wherein the one or more access nodes comprises at least one access node with a moving field of view relative to the plurality of terminals, wherein the system further comprises a scheduler which is distributed across the system and is configured to:

receive one or more messages for transmission by one of the one or more terminals, one or more satellite access nodes, or one or more gateways;

determine one or more interference parameters of one or more external communication systems for a transmission location and during a transmission time period;

schedule transmission of the one or more messages in one or more slots in a plurality of slots by selecting one or more slot transmission parameters for transmitting the one or more messages during the transmission time period and determining, using the one or more interference parameters, the likelihood that the selected one or more slot transmission parameters are likely to cause interference to the one or more external communication systems, and if interference is determined to be likely, then adjusting one or more of the slot transmission parameters to determine if a change will result in an acceptable reduction of the interference, wherein determining, using the one or more interference parameters, the likelihood that the selected one or more slot transmission parameters are likely to cause interference comprises estimating a time varying estimate of inference over the transmission time period and selecting one or more slot transmission parameters and adjusting one or more of the slot transmission parameters is performed by using an optimization method to determine the one or more slot transmission parameters that minimise or constrain a total interference.

40. The communication system as claimed in claim 39, wherein determining, using the one or more interference parameters, the likelihood that the selected one or more slot transmission parameters are likely to cause interference further comprises estimating a probability of error that a transmission is not received at a target receiver and a latency and the optimization method determines the one or more slot transmission parameters by minimising one of the time varying estimate of inference over the transmission time period, the probability of error that a transmission is not received at a target receiver and the latency subject to one or more constraints on the time varying estimate of inference over the transmission time period, the probability of error that a transmission is not received at a target receiver and the latency, and the optimization is performed jointly over all slot transmission parameters.

41. The communication system as claimed in claim 39, wherein determining, using the one or more interference parameters, the likelihood that the selected one or more slot transmission parameters are likely to cause interference further comprises estimating a probability of error that a transmission is not received at a target receiver and a latency and the optimization method uses a greedy scheduling algorithm that selects a transmission time sequentially such that transmissions are scheduled at times that decreases the latency and probability of error whilst minimally increasing the interference.

* * * * *